(12) United States Patent
Kinoto

(10) Patent No.: US 12,289,028 B2
(45) Date of Patent: Apr. 29, 2025

(54) ROTATING ELECTRIC MACHINE AND INSTALLATION CONFIGURATION OF ROTATING ELECTRIC MACHINE ON VEHICLE

(71) Applicant: NISSAN MOTOR CO., LTD., Yokohama (JP)

(72) Inventor: Takuma Kinoto, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 246 days.

(21) Appl. No.: 17/800,967

(22) PCT Filed: Feb. 20, 2020

(86) PCT No.: PCT/JP2020/006833
§ 371 (c)(1),
(2) Date: Aug. 19, 2022

(87) PCT Pub. No.: WO2021/166171
PCT Pub. Date: Aug. 26, 2021

(65) Prior Publication Data
US 2023/0076314 A1 Mar. 9, 2023

(51) Int. Cl.
*H02K 5/20* (2006.01)
*H02K 9/19* (2006.01)

(52) U.S. Cl.
CPC ............... *H02K 5/20* (2013.01); *H02K 9/19* (2013.01)

(58) Field of Classification Search
CPC .. H02K 9/19; H02K 5/24; H02K 5/20; H02K 5/128

USPC .......................................................... 310/52
See application file for complete search history.

(56) References Cited

U.S. PATENT DOCUMENTS

| | | | | |
|---|---|---|---|---|
| 6,836,051 B2* | 12/2004 | Hiwaki | ................... | H02K 1/185 |
| | | | | 310/254.1 |
| 7,164,218 B2* | 1/2007 | Kimura | ................. | F04C 23/008 |
| | | | | 310/58 |
| 7,847,444 B2* | 12/2010 | Kingman | ............... | H02K 5/203 |
| | | | | 310/91 |
| 9,331,551 B2* | 5/2016 | Ikeda | ..................... | H02K 5/203 |

(Continued)

FOREIGN PATENT DOCUMENTS

| | | |
|---|---|---|
| JP | 07-184350 A | 7/1995 |
| JP | 2004-297936 A | 10/2004 |
| JP | 2013-042661 A | 2/2013 |

(Continued)

*Primary Examiner* — Terrance L Kenerly
*Assistant Examiner* — Theodore L Perkins
(74) *Attorney, Agent, or Firm* — Foley & Lardner LLP

(57) ABSTRACT

A rotating electric machine includes a tube-shaped outer housing and a tube-shaped inner housing that forms a coolant flow channel between the outer housing and the inner housing. The inner housing is fixed with the outer housing by press-fitting or shrink-fitting at one end thereof in its axial direction and fastened with the outer housing at another end by plural bolts. One or more non-contacting sections, in which an inner circumferential surface of the outer housing and an outer circumferential surface of the inner housing are not in contact with each other, are formed at a fixation portion made by the press-fitting or the shrink-fitting between the outer housing and the inner housing along a circumferential direction thereof.

7 Claims, 15 Drawing Sheets

(56) References Cited

U.S. PATENT DOCUMENTS

2018/0013324 A1* 1/2018 Takabe ................ H02K 1/187
2019/0229581 A1   7/2019 Takenori

FOREIGN PATENT DOCUMENTS

JP          6314158 B2    4/2018
WO    WO-2019/156075 A1   8/2019

* cited by examiner 1i (and 2)

1i (and 2)

ROTATING ELECTRIC MACHINE AND INSTALLATION CONFIGURATION OF ROTATING ELECTRIC MACHINE ON VEHICLE

TECHNICAL FIELD

The present invention relates to a rotating electric machine, and an installation configuration of the rotating electric machine on a vehicle.

BACKGROUND ART

A Patent Literature 1 listed below discloses a rotating electric machine. In this rotating electric machine, a tube-shaped stator core is attached to an inner surface of a tube-shaped housing by shrink-fitting, and a rotor is rotatably provided in the stator core. The rotating electric machine generates heat and thereby a coolant flow channel in which coolant circulates is formed in the housing in order to cool the heat. The housing is configured of a tube-shaped outer housing and a tube-shaped inner housing that is inserted into the outer housing in order to form the coolant flow channel.

In order to form a coolant flow channel without increasing a size of a rotating electric machine, a housing with such a double-wall structure is adopted. Specifically, an entire of its inner housing on whose outer circumferential surface a helical groove is formed is press-fitted or shrink-fitted in its outer housing.

PRIOR-ART LITERATURE

Patent Literature

Patent Literature 1: Japanese Granted Patent Publication No. 6314158

SUMMARY OF INVENTION

Problem to be Solved by the Invention

In a rotating electric machine, its inner housing vibrates due to rotations of its rotor. This vibration is transferred from the inner housing to the outer housing, and then noise radiates outward from the housing. The above-mentioned double-tube structure for forming a coolant flow channel may be conductive to the radiation noise.

Therefore, an object of the present invention is to provide a rotating electric machine with a double-tube structure that can restrict noise radiation. And, another object of the present invention is to provide an installation configuration of the rotating electric machine on a vehicle that can restrict noise radiation effectively.

Means for Solving the Problem

A first aspect of the present invention provides a rotating electric machine that includes a tube-shaped outer housing, and a tube-shaped inner housing provided within the outer housing to form a coolant flow channel between the outer housing and the inner housing. The inner housing is fixed with the outer housing by press-fitting or shrink-fitting at one end in an axial direction and fastened with the outer housing at another end by plural bolts. One or more non-contacting sections, in which an inner circumferential surface of the outer housing and an outer circumferential surface of the inner housing are not in contact with each other, are formed at a fixation portion made by the press-fitting or the shrink-fitting along a circumferential direction thereof.

A second aspect of the present invention provides an installation configuration of the rotating electric machine according to the above first aspect. In the installation configuration, the fixation portion is divided, along its circumferential direction, into an upper quarter circumferential range, a lower quarter circumferential range, a front quarter circumferential range and a rear quarter circumferential range when being viewed in the axial direction. Here, a total circumferential length of the non-contacting sections in the front quarter circumferential range and the rear quarter circumferential range is longer than a total circumferential length of the non-contacting sections in the upper quarter circumferential range and the lower quarter circumferential range.

A third aspect of the present invention provides an installation configuration of the rotating electric machine according to the above first aspect. In the installation configuration, the fixation portion is divided, along its circumferential direction, into a passenger compartment side range closer to a passenger compartment and an opposite side range on an opposite side to the passenger compartment when being viewed in the axial direction. Here, a total circumferential length of the non-contacting sections in the passenger compartment side range is longer than a total circumferential length of the non-contacting sections in the opposite side range.

Effect of the Invention

According to the first aspect, it is possible to provide a rotating electric machine that can restrict noise radiation. In addition, according to the second aspect, it is possible to restrict noise radiation of the rotating electric machine installed on a vehicle more effectively. Furthermore, according to the third aspect, it is possible to restrict noise radiation of the rotating electric machine installed on a vehicle toward a passenger compartment more effectively.

DESCRIPTION OF EMBODIMENTS

Hereinafter, a rotating electric machine according to an embodiment will be described with reference to the drawings.

The rotating electric machine in present embodiment is a motor generator (MG) installed on a vehicle, which can function as a motor and can function as an electric generator. In the present embodiment, as a rotating electric machine, provided are a front MG 100F that is installed at a front section of a vehicle V to drive front wheels FW and a rear MG 100R that is installed at a rear section of the vehicle V to drive rear wheels RW (see FIG. 10). The front MG 100F and the rear MG 100R can also generate regenerative power when the vehicle V decelerates.

Figure 1:
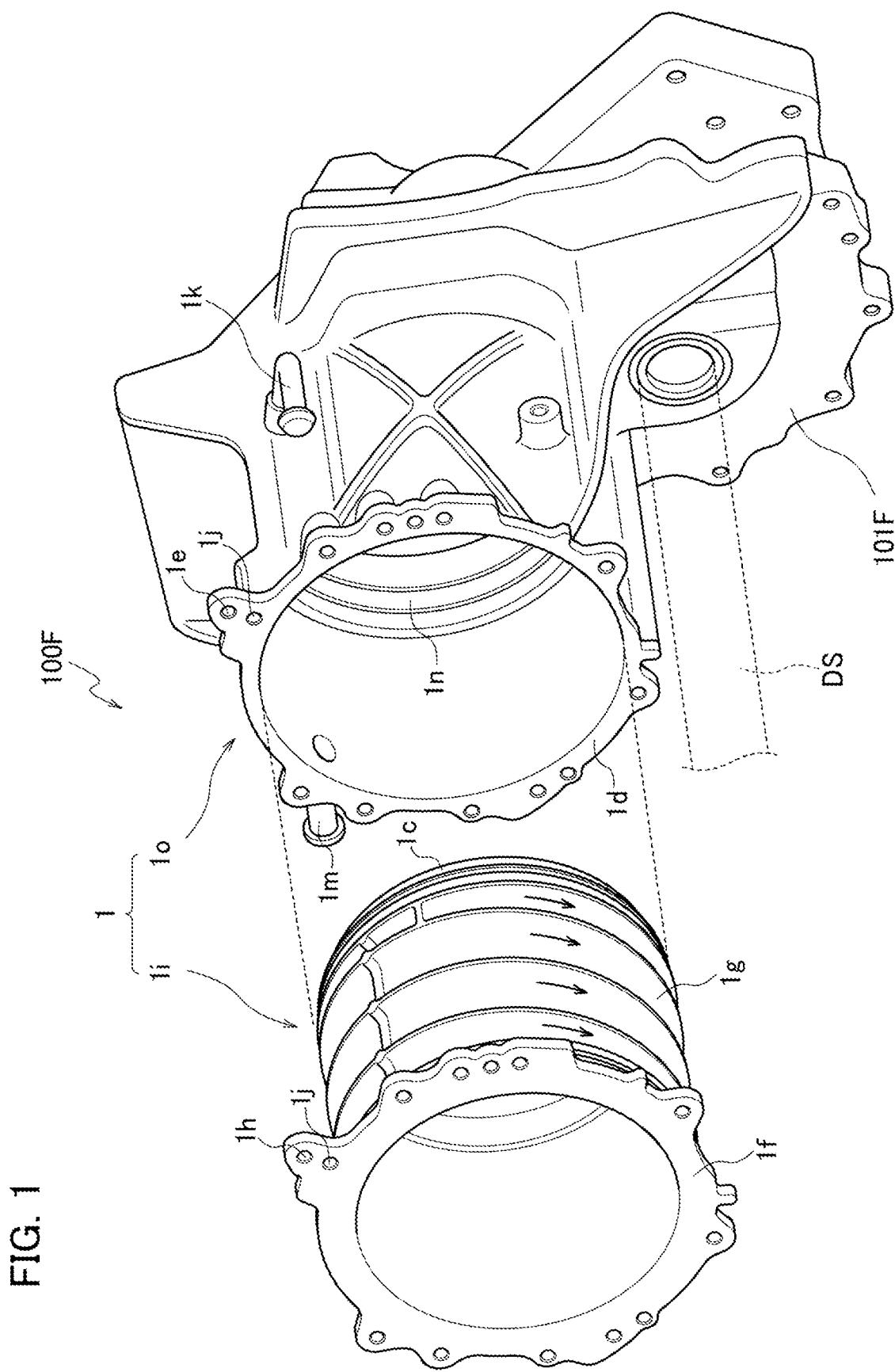
FIG. 1 is an exploded perspective view of a rotating electric machine (front MG) according to an embodiment.

First, the front MG 100F will be described. FIG. 1 shows an exploded perspective view of a housing 1 of the front MG 100F. The housing 1 has a double-tube structure consisting of an outer housing 1o and an inner housing 1i. The housing 1 will be explained in detail later. Note that the front MG 100F in the present embodiment is equipped also integrally with a front gear unit 101F. The front gear unit 101F has a reduction gear set and a differential gear inside. An after-explained rotary shaft of a rotor 3 of the front MG 100F is mechanically connected to drive shafts DS of the front wheels FW via the reduction gear set and the differential gear. Note that the drive shafts DS are schematically shown in the drawings with their constant-velocity joints and so on omitted. A portion of the housing of the front gear unit 101F is integrally coupled to the above-mentioned outer housing 1o.

Figure 2:
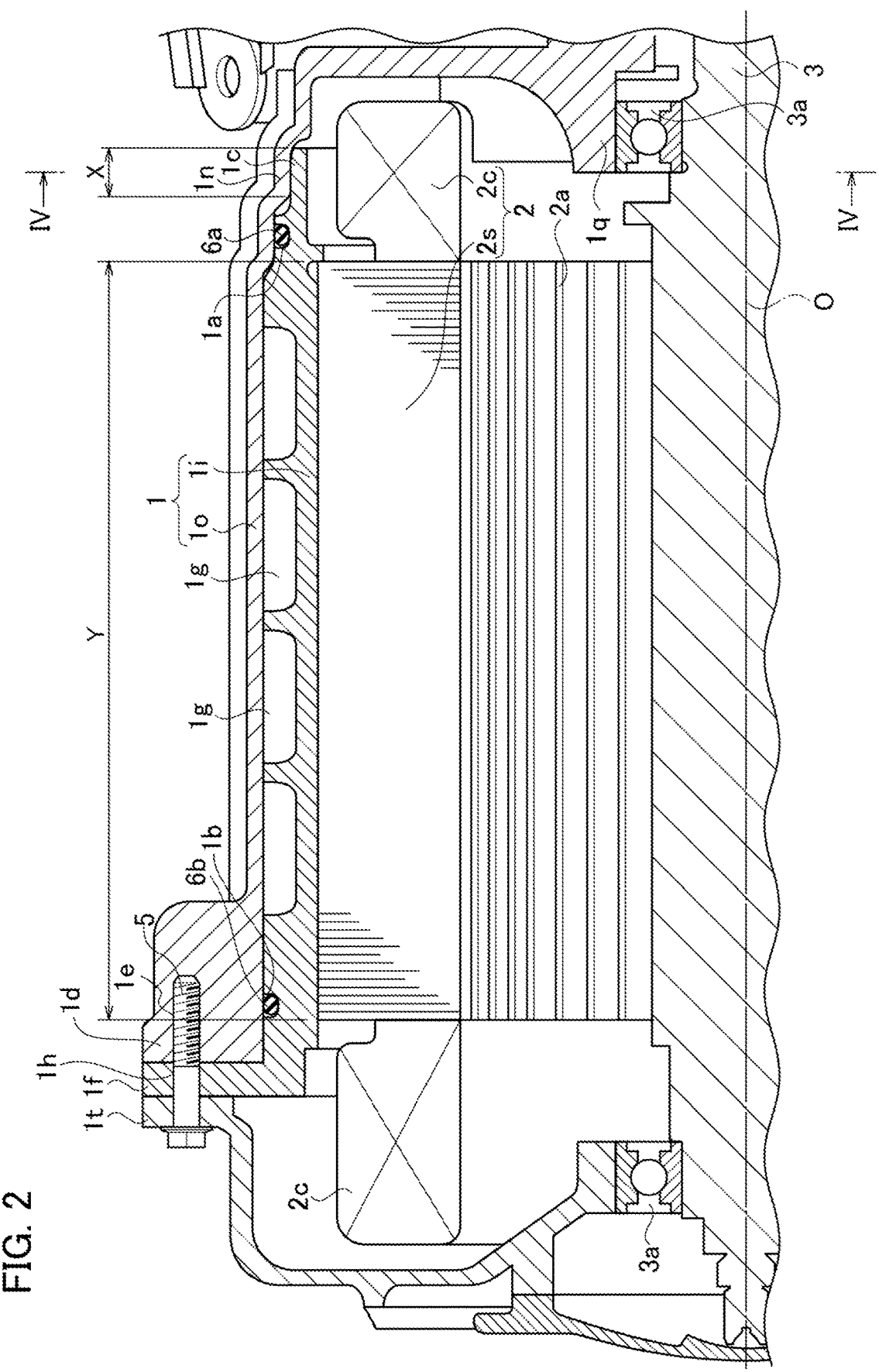
FIG. 2 is a cross-sectional view of the rotating electric machine including a center O of a rotary shaft of the front MG.

FIG. 2 shows a cross-sectional view including a center O of the rotary shaft of the front MG 100F. The front MG 100F includes a stator 2 and the rotor 3 in its housing 1. The stator 2 is shrink-fitted in the inside of the inner housing 1i and includes a stator core 2s and a coil 2c similarly to general motors. The stator core 2s is configured by laminating a lots of metal laminates (electromagnetic steel plates) in a direction of the rotary shaft (i.e., an axial direction). A number of slots 2a are formed at equal intervals on an inner circumferential surface of the stator core 2s. The coil 2c is wound in the slots 2a. Both ends of the coil 2c in the wound state protrude outward from both ends of the stator core 2s in the axial direction, respectively, to form coil ends. In FIG. 2, the coil ends are shown in a simplified manner.

The rotor 3 is rotatably supported by the housing 1 via ball bearings 3a at its both ends. Note that the rotor 3 in FIG. 2 is shown with its portion omitted, and only its rotary shaft is shown so as to make the above-mentioned stator core 2s visible.

The outer housing 1o and the inner housing 1i, that constitute the housing 1, are formed of aluminum alloy. As shown in FIG. 1, the inner housing 1i is formed to have a tubular shape, and a helical groove 1g is formed on its outer circumferential surface to serve as a coolant flow channel for cooling the front MG 100F. Seal grooves 1a and 1b for accommodating O-rings 6a and 6b (see FIG. 2) that ensure liquid tightness of the coolant flow channel are also formed on the outer circumferential surface of the inner housing 1i. The seal groove 1a is formed on its one-end side (right-end side in FIG. 2) of the inner housing 1i, and the seal groove 1b is formed on another-end side (left-end in FIG. 2) opposite to the one-end side.

The one end of the inner housing 1i functions as an inner circumferential fixed portion 1c that is fixed with the outer housing 1o by press-fitting. Only the inner circumferential fixed portion 1c of the inner housing 1i is secured to an outer circumferential fixed portion 1n of the outer housing 1o by press-fitting. A press-fit length (axial length of a fixation range X) is short. The fixation area X where the inner housing 1i and the outer housing 1o are secured to each other by press-fitting in the axial direction is shown in FIG. 2. Note that the inner housing 1i (the inner circumferential fixed portion 1c) and the outer housing 1o (the outer circumferential fixed portion 1n) may be fixed to each other in the fixation area X by shrink-fitting.

In addition, as described mentioned above, the inner housing 1i is shrink-fitted with the stator core 2s, and a shrink-fit area Y of the inner housing 1i and the stator core 2s in the axial direction is also shown in FIG. 2. The outer diameter of the stator core 2s is slightly made larger than the inner diameter of the inner housing 1i. The difference in these diameters is referred to as an "interference" (shrink-fit is also called as interference-fit). Then, one of two members is thermally expanded or contracted to cause thermal deformation greater than the interference, and the two members are fitted together. When the thermal deformation reverts, the two components are firmly fixed to each other by the interference. In the present embodiment, the stator core 2s is formed by a number of metal laminates (and the coil 2c is also wound), so the inner housing 1i is thermally expanded and then shrink-fitted. In general, a stronger fixation is possible with a shrink-fit than with a press-fit, but stress remained after shrink-fit becomes greater. In addition, the larger an interference is, the greater the stress remained after shrink-fit.

Figure 3:
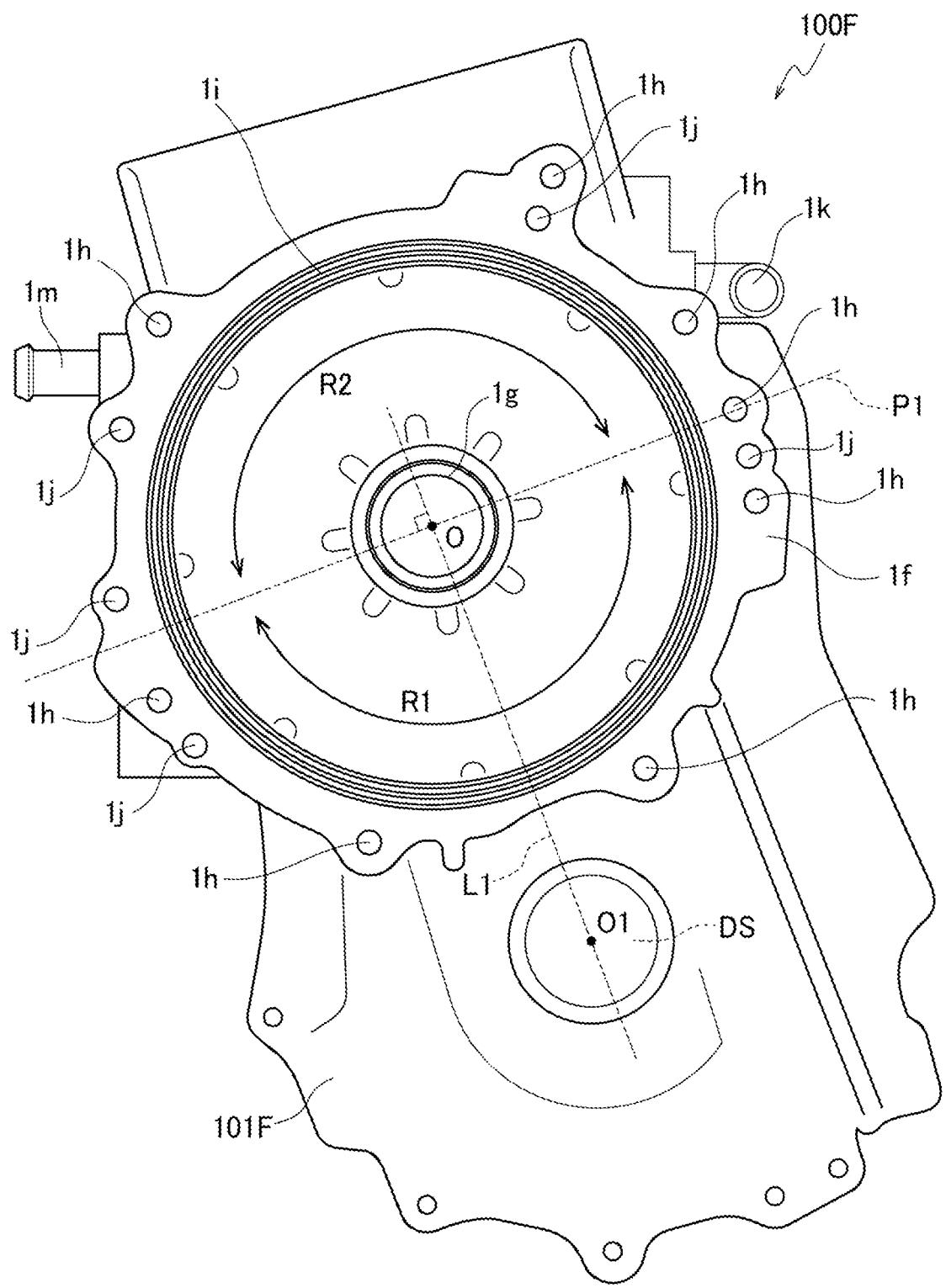
FIG. 3 is a side view of the front MG viewed in a direction of the rotary shaft.

As shown in FIG. 1, a flange 1d extending outward perpendicular to the axial direction is formed at the other end of the outer housing 1o. Plural bolt holes 1e are formed in the flange 1d. As shown in FIGS. 1 and 3, a flange 1f extending outward perpendicular to the axial direction is also formed at the other end of the inner housing 1i. Bolt insertion holes 1h are formed in the flange 1f. Note that FIG. 3 shows a side view of the housing 1 (the outer housing 1o and the inner housing 1i) viewed in the axial direction from the left side of the vehicle V. However, the stator 2, the rotor 3 and a cover 1t are not shown in FIG. 3.

The other end of the inner housing 1i is fixed to the outer housing 1o by bolts 5 (see FIG. 2) inserted through the bolt insertion holes 1h. That is, the one end of the inner housing 1i is secured to the outer housing 1o by press-fitting (or shrink-fitting), and the other end of the inner housing 1i is secured to the outer housing 1o by bolt-fastening. Note that locating holes 1j, into which locating pins for positioning the both are inserted, are also formed on the flange 1d of the outer housing 1o and the flange 1f of the inner housing 1i (see FIG. 3). In addition, when bolt-fastening the inner housing 1i with the outer housing 1o, the cover 1t for closing the other end of the housing 1 is also fastened together as shown in FIG. 2 in the present embodiment.

As shown in FIG. 1, the outer housing to is formed in a tube shape and plural ribs for ensuring its strength and stiffness are formed on its outer circumferential surface. In addition, a supply port 1k for supplying coolant to the coolant flow channel formed by the above-described helical groove 1g of the inner housing 1i and a discharge port 1m for discharging the coolant from the coolant flow channel are formed on the outer housing 1o. Although the outer housing 1o is formed in a tube shape, the front gear unit 101F provided integrally with the outer housing 1o is extended laterally from the tubular portion of the outer housing 1o.

One end (right end in FIG. 2) of an accommodation chamber of the outer housing 1o for accommodating the inner housing 1i is closed by its wall portion. However, a holding portion 1q to which a ball bearing 3a for holding the one end of the rotor 3 is attached is formed in the center of the wall portion. Note that a hole through which the rotary shaft of the rotor 3 is extended out is formed in the center of the holding portion 1q. On the other hand, another end of the above-mentioned accommodation chamber (left end in FIG. 2) is open for inserting the inner housing 1i into which the stator core 2s is shrink-fitted. The other end of the accommodation chamber is closed by the cover 1t after the inner housing 1i is inserted thereto and the rotor 3 is further assembled in it. A ball bearing 3a is attached also to the cover 1t to hold the other end of the rotor 3.

According to the double-tube structure described above, a coolant flow channel can be formed easily and space efficiently. In addition, the one end of the inner housing 1i is fixed to the outer housing 1o by press-fitting (or shrink-fitting), and the other end of the inner housing 1i is fixed to the outer housing 1o by the bolts 5. That is, the inner housing 1i is fixed to the outer housing 1o at its both ends (not cantilevered fixing). Therefore, even if a reaction force of a rotational torque of the front MG 100F acts on the inner housing 1i, there is no torsion of the inner housing 1i, and strength and stiffness of the front MG 100F are not reduced, and noise and vibration characteristics are not deteriorated.

Furthermore, the press-fit length between the inner housing 1i (the inner circumferential fixed portion 1c) and the outer housing 1o (the outer circumferential fixed portion 1n) is short, so equipment for the press-fitting does not have to be large. In addition, since the press-fit length is short and the press-fit force is small, the inner circumferential fixed portion 1c can be made thinner (its inner diameter can be made larger) and thereby a clearance to the coil end of the coil 2c can be made larger. As a result, the coil end (the coil 2c) can be prevented from contacting with the inner housing 1i when assembling the rotating electric machine. Even when the inner housing 1i and the outer housing 1o are fixed with each other by shrink-fitting, the outer housing 1o (the outer circumferential fixed portion 1n) is thermally expanded or thermally shrunk only partially, and thereby equipment for shrink-fitting does not have to be large. Moreover, since the shrink-fit length is short, the inner circumferential fixed portion 1c can be made thinner and thereby the coil end (the coil 2c) can be prevented from contacting with the inner housing 1i.

Figure 4:
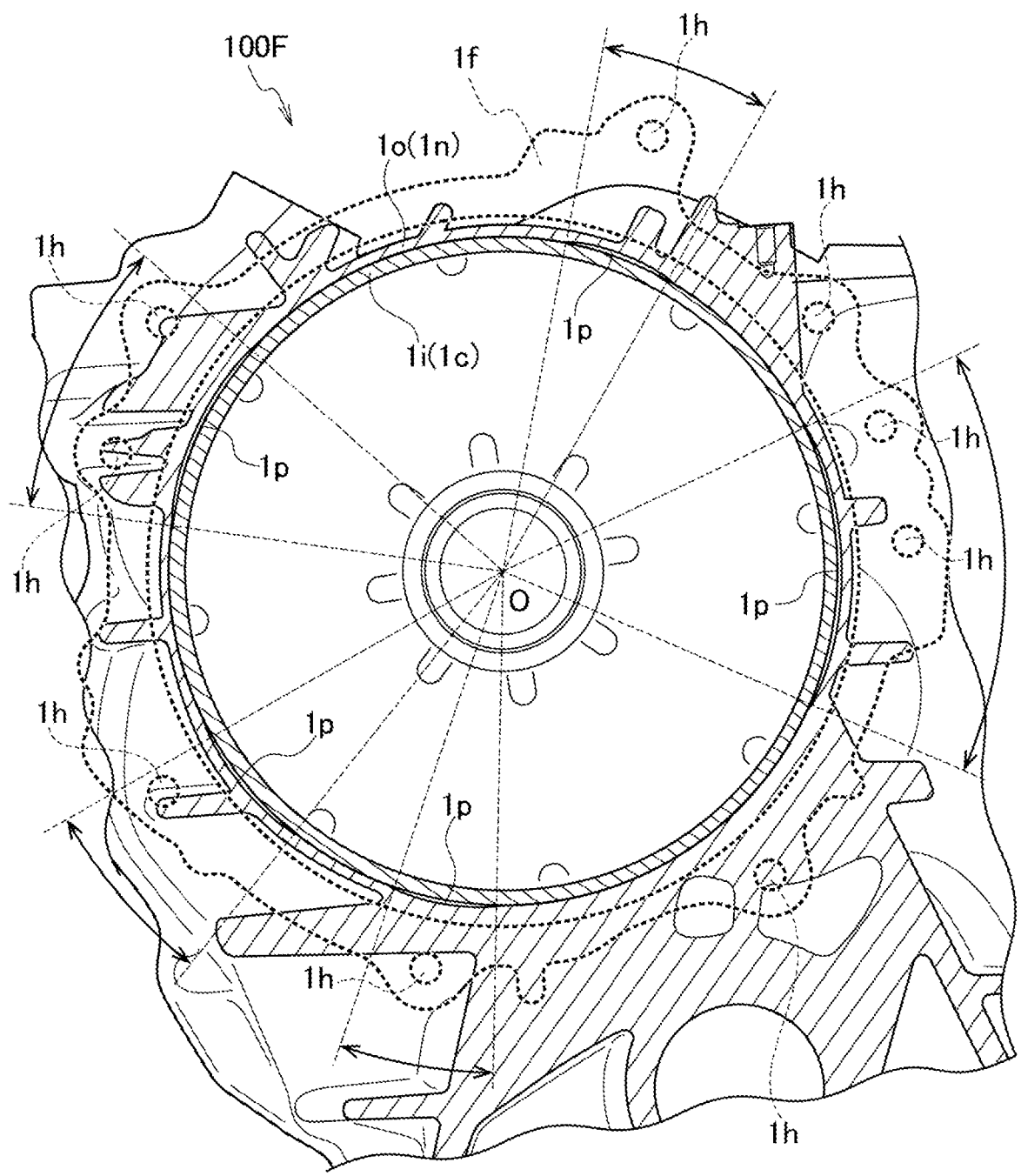
FIG. 4 is a cross-sectional view taken along a line IV-IV in FIG. 2.

FIG. 4 is a cross-sectional view taken perpendicularly to the axial direction at the press-fitted (or shrink-fitted) fixation portion (the fixation area X) viewed in the axial direction between the inner housing 1i and the outer housing 1o. Note that FIG. 4 shows a state where the inner housing 1i is press-fitted (or shrink-fitted) into the outer housing 1o, and the stator 2, the rotor 3 and the cover 1t are not shown therein. In the present embodiment, in order to suppress the radiated noise from the front MG 100F, five non-contacting sections 1p are formed at the fixation portion along its circumferential direction where the inner circumferential surface of the outer housing 1o and the outer circumferential surface of the inner housing 1i are not in contact with each other.

In the present embodiment, the non-contacting sections 1p are formed by positioning the inner surface of the outer housing to on an outer side from a reference circle. However, the non-contacting sections 1p may be formed by positioning the outer circumferential surface of the inner housing 1i on an inner side from the reference circle. In addition, it is also possible to form the non-contacting sections 1p by positioning the inner circumference of the outer housing to on the outer side and positioning the outer circumference of the inner housing 1i on the inner side. Note that the non-contacting sections 1p in the present embodiment are simply minute gaps, but their interiors may be filled with an elastic material such as rubber.

A magnetic force is generated between the stator 2 and the rotor 3 that rotates in the front MG 100F. Therefore, sounds generated in the front MG 100F, especially in the inner housing 1i, are radiated outward and then transferred through the outer housing 1o. Since the above-described non-contacting sections 1p blocks or mitigates the transferring of vibrations (sounds), the vibrations of the inner housing 1i (and the stator 2 integrated therewith by shrink-fitting) can be suppressed and the outward transferring and radiation of the sounds caused by the vibrations can also be suppressed. As a result, the noise of the rotating electric machine (the front MG 100F) can be suppressed. In addition, since the non-contacting sections 1p alleviate stress concentration in the fixation portion, the fixation portion is sufficiently rigid even without strengthening it and thereby the inner housing 1i can be manufactured at a lighter weight and lower cost.

Noise suppression effect can be brought if at least one non-contacting section 1p is provided, but the noise suppression effect can be brought more pronounced by forming the plural non-contacting sections 1p. However, since the fixation portion is a portion for securing the inner housing 1i and the outer housing 10, the two may not be firmly secured with each other if a total circumferential length of the plural non-contacting sections 1p becomes too long. In addition, depending on the circumferential length of each of the non-contacting sections 1p, the inner housing 1i and outer housing 1o may not be firmly secured with each other if the plural non-contacting sections 1p are arranged disproportionately. Therefore, the circumferential length and the arrangement of the non-contacting sections 1p are determined so as not to interfere with the fixation between the inner housing 1i and the outer housing 1o.

In addition, the positions of the non-contacting sections 1p at the one end of the housing 1 are made coincided with the positions of the bolts 5 at the other end thereof, respectively. More specifically, at least one of the bolts 5 is located within each center angle range of the non-contacting sections 1p when being viewed in the axial direction. FIG. 4 shows the flange if and bolt insertion holes 1h of the inner housing 1i (the flange 1d and the bolt holes 1e of the outer housing 1o) are shown by dotted lines. As shown in FIG. 4, the bolt 5 (the bolt insertion hole 1h, the bolt hole 1e) is located in each central angular range of the non-contacting sections 1p. In other words, the positions of the non-contacting sections 1p are determined so as to be coincided with the fastening positions by the bolts 5 at the one end of the housing 1. Two bolts 5 are arranged for the central angular range located on a right side and an upper left side in FIG. 4, and one bolt 5 is arranged for each of the other central angular ranges.

Figure 5A:
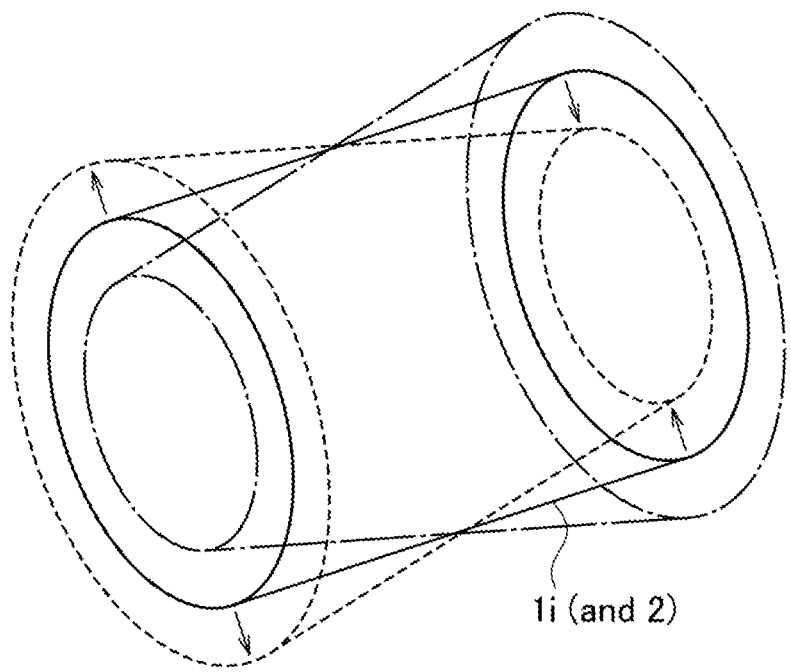
FIG. 5A is a schematic perspective view showing vibration (antiphase vibration) of an inner housing.
Figure 5B:
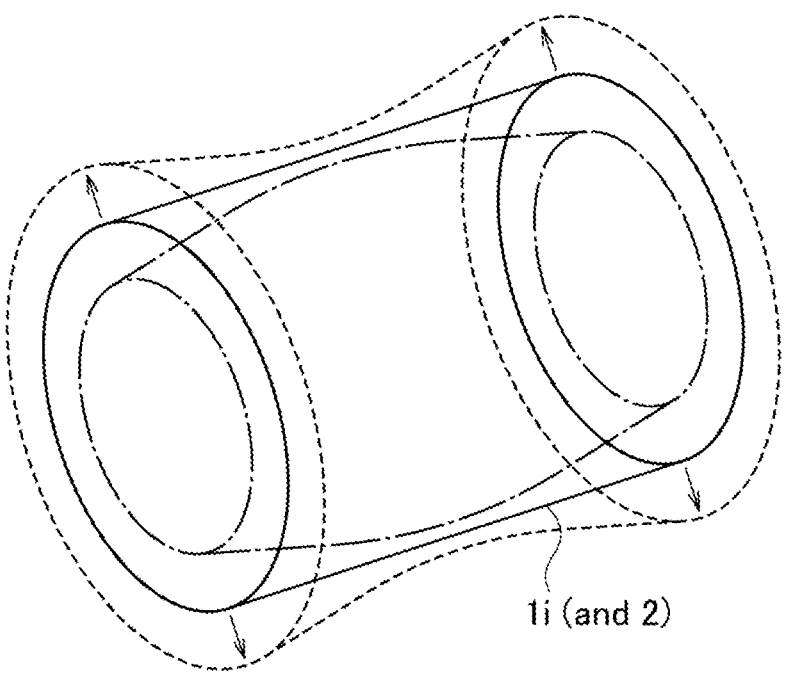
FIG. 5B is a schematic perspective view showing vibration (coordinate phase vibration) of the inner housing.

Hereinafter, the reason will be explained with reference to FIG. 5A and FIG. 5B. FIG. 5A and FIG. 5B schematically show an annular 0th vibration mode of the inner housing 1i and the stator 2 integrated therewith. Note that the n-th vibration is described later. Considering vibration of the cylindrical member expanding and contracting in its radial direction, a vibration mode in which an entire circumference of the cylindrical member expands or contracts is the annular 0th vibration mode. Then, FIG. 5A shows a vibration mode (an antiphase vibration) in which vibration phase at the one end of the housing 1 in the axial direction differs from vibration phase at the other end thereof. FIG. 5B shows a vibration mode (a coordinate phase vibration) in which vibration phase at the one end of the housing 1 is the same as vibration phase at the other end thereof.

According to the antiphase vibration shown in FIG. 5A, the one end expands while the other end contracts, so pressure fluctuations in the housing 1 are compensated. On the other hand, according to the coordinate phase vibration shown in FIG. 5B, both of the ends expand (or contract) at the same time, so pressure fluctuations in the housing 1 are facilitated. Therefore, the latter coordinate phase vibration mode is noisier. If the coordinate phase vibration can be effectively suppressed, noise can be effectively suppressed. For this reason, the non-contacting sections 1p are formed at the one end of the housing 1 in the present embodiment to suppress the transmission of vibration by the gaps of the non-contacting sections 1p. Although transferring of vibration from the inner housing 1i to the outer housing 1o cannot be suppressed at the fastening portions of the bolts 5 at the other end of the housing 1, transferring of vibration at the non-contacting sections 1p at the one end thereof can be suppressed. As a result, the noise transferring can be effectively suppressed in the above-mentioned coordinate vibration mode. In other words, the radiated noise from the housing 1 can be reduced.

As described above, the front MG 100F further includes the front gear unit 101F. A housing of the front gear unit 101F is integrally coupled (integrally casted in the present embodiment) with the outer housing 1o on a side of the above-described fixation portion (the fixation range X) in the axial direction. The center O1 of the output shafts (the drive shafts DS) of the front gear unit 101F is not coincident with the center O of the rotary shaft of the front MG 100F, but parallel thereto. Note that, in the after-described rear MG 100R, the center O and the center O1 coincide with each other.

Here, when being viewed in the axial direction as shown in FIG. 3, the fixation portion (the fixation range X) is divided by a first plane P1 that is perpendicular to a straight line L1 passing through the center O and the center O1 and passes through the center O. Specifically, the fixation portion is divided by the first plane P1 into a first half circumferential range R1 on a side of the output shaft (the center O1) of the front gear unit 101F and a second half circumferential range R2 on the opposite side to the output shaft. In this case, a total circumferential length of the non-contacting sections 1p in the first half circumferential range R1 is longer than a total circumferential length of the non-contacting sections 1p in the second half circumferential range R2. Note that, in a case where a single non-contacting section 1p is divided by the first plane P1, its divided lengths are added to the circumferential length of the first half circumferential range R1 and the circumferential length of the second half circumferential range R2, respectively.

The plural non-contacting sections 1p shown in FIG. 4 also satisfy this condition. The stiffness of the fixation portion is not uniform along its circumferential direction, and the stiffness of the first half circumferential range R1, to which the housing of the front gear unit 101F is integrally coupled, is higher than the stiffness of the second half circumferential range R2. Therefore, the total circumferential length of the non-contacting sections 1p in the first half circumferential range R1 is longer than the total circumferential length of the non-contacting sections 1p in the second half circumferential range R2, and thereby the sufficient non-contacting sections 1p can be provided while ensuring the stiffness of the fixation portion. By arranging the non-contacting sections 1p in this manner, the noise radiation can be suppressed while ensuring the stiffness of the fixation portion.

Figure 6:
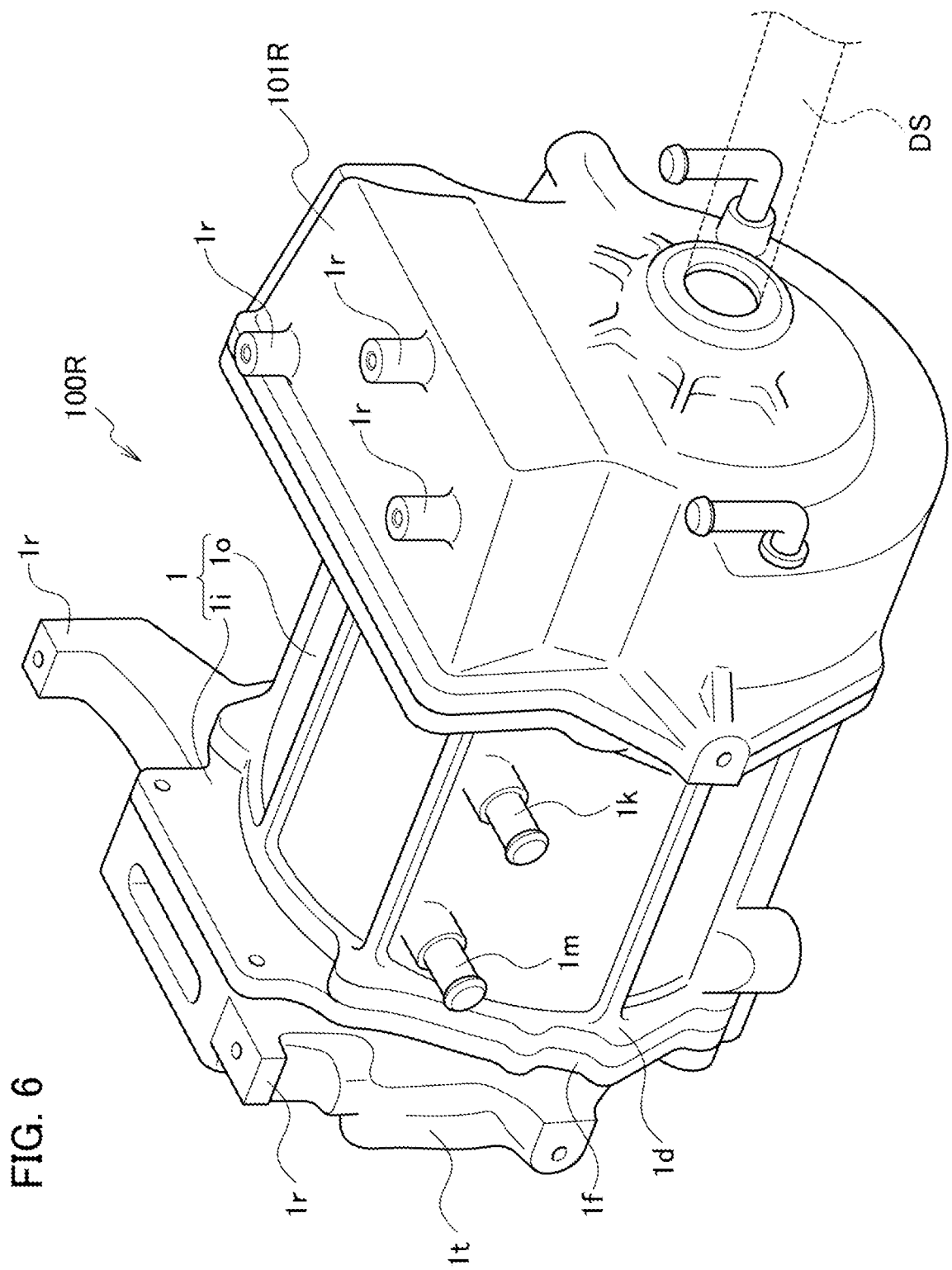
FIG. 6 is a perspective view of another rotating electric machine (rear MG) according to the embodiment.
Figure 7:
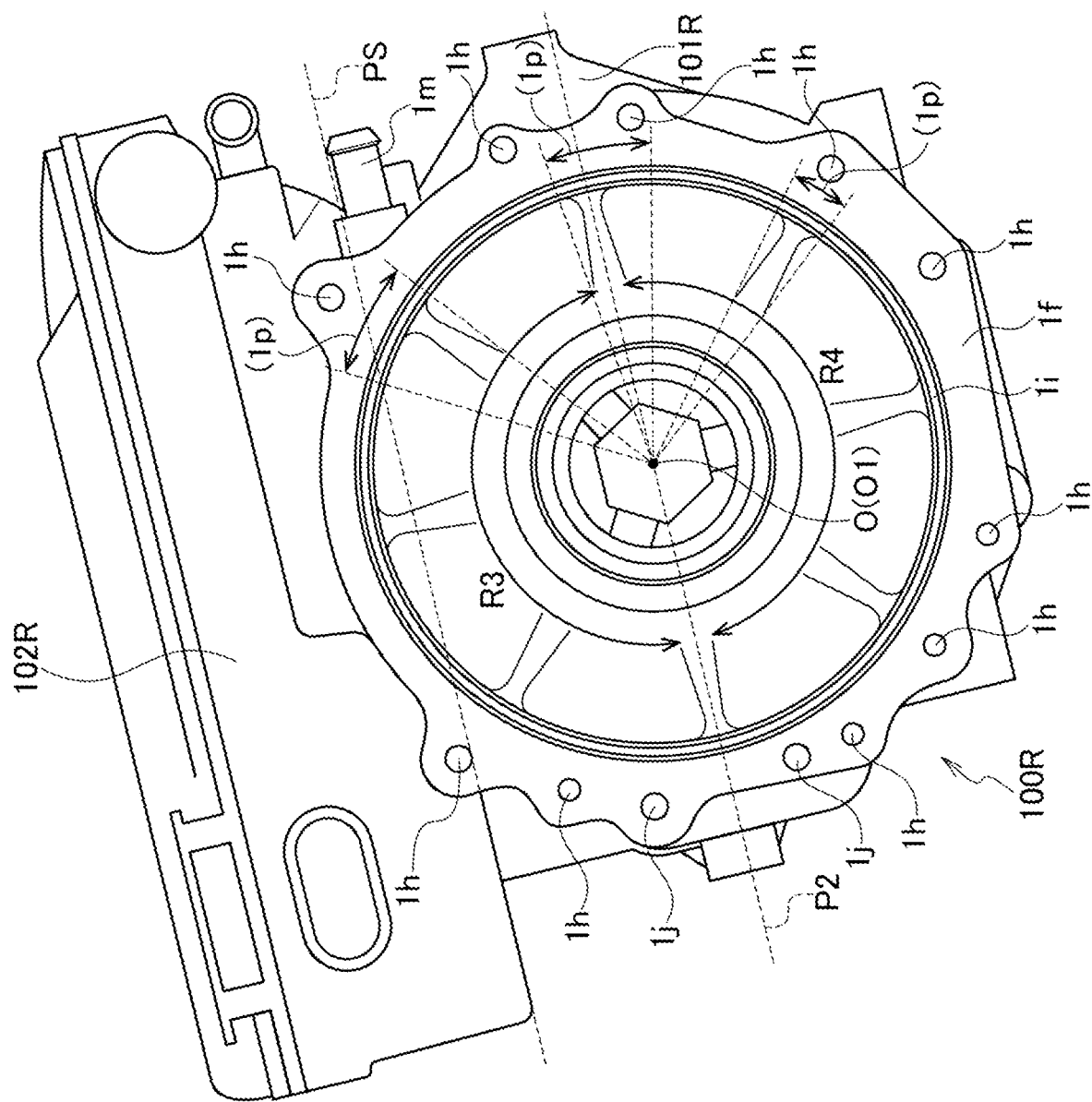
FIG. 7 is a side view of the rear MG viewed in a direction of its rotary shaft.

In addition, the above-described rear MG 100R also has basically the same structure as that of the front MG 100F. Equivalent configurations are labelled with the same reference numbers, respectively. That is, as shown in FIG. 6 and FIG. 7, the rear MG 100R also has a housing 1 with a double-tube structure formed by an outer housing 1o and an inner housing 1i. A coolant flow channel is formed between the outer housing 1o and inner housing 1i. In the rear MG 100R, one end of the inner housing 1i is also fixed to the outer housing to by press-fitting (or shrink-fitting), and the other end of the inner housing 1i is fixed to the outer housing 1o by bolt-fastening. The bolt-fastening is made by the bolt insertion holes 1h formed on the flange 1f of the inner housing 1i and the bolt holes (1e) formed on the flange 1d of the outer housing 1o.

The rear MG 100R is also equipped with a rear gear unit 101B integrally. The rear gear unit 101R is located on a left side of the rear MG 100R. The rotary shaft (the center O) of the rear MG 100R and the output shaft (the center O1) of the rear gear unit 101R are coincident with each other. A planetary gear set as a reduction gear unit is housed inside the rear gear unit 101R. The rotary shaft of the rear MG 100R is a hollow shaft and is directly connected to the cylindrical sun gear of the planetary gear set. The ring gear of the planetary gear set is fixed to the inner surface of the housing of the rear gear unit 101R.

The output of the rear MG 100R that is input to the sun gear is output from the planetary gear carrier. The planetary gear carrier also incorporates a differential gear. The output shaft of the planetary gear carrier is also led out on the opposite side through the cylindrical sun gear and the hollow rotary shaft of the rear MG 100R. Therefore, although the rear MG 100R and the rear gear unit 101R are arranged on the same axis, both ends of the output shaft of the rear gear unit 101R are mechanically connected to the left and right rear wheels RW, respectively via the drive shafts DS.

Also in the housing 1 of the rear MG 100R, the one end of the inner housing 1*i* is fixed to the outer housing 1*o* by press-fitting (or shrink-fitting). And, the non-contacting sections 1*p* are formed at its fixation portion similarly. In addition, the other end of the inner housing 1*i* is fixed to the outer housing 1*o* by bolt-fastening. Then, at least one of the bolts 5 is located within each center angle range of the non-contacting sections 1*p* when being viewed in the axial direction. For the bolt-fastening, the flange 1*d* (see FIG. 6) is formed at the other end of the outer housing 1*a* and the flange 1*f* (see FIG. 6 and FIG. 7) is formed at the other end of the inner housing 1*i*. The bolt insertion holes 1*h* are formed on the flange 1*f*. Note that FIG. 7 is a side view of the housing 1 (the outer housing 1*o* and the inner housing 1*i*) viewed from the right side of the vehicle V along the axial direction. However, the stator 2, the rotor 3 and the cover 1*t* are not shown in FIG. 7.

In addition, also in the rear MG 100R similarly to the above-described the front MG 100F, the above-described effects of the non-contacting sections 1*p* are brought. That is, by forming the non-contacting sections 1*p*, the vibration of the inner housing 1*i* (and the stator 2 integrated therewith by shrink-fitting) can be suppressed and the outward transferring and radiation of the sound caused by the vibration can be suppressed. As a result, the noise of the rotating electric machine (the rear MG 100R) can be suppressed. In addition, the positions of the non-contacting sections 1*p* at the one end of the housing 1 are made coincided with the positions of the bolts 5 at the other end thereof, respectively. Therefore, the noise transferring caused by the coordinate phase vibration mode can be effectively suppressed. In other words, the radiated noise from the housing 1 can be reduced.

As shown in FIG. 7, the rear MG 100R is further equipped with a control unit 102R. The control unit 102R controls the operation of the rear MG 100R. The control unit 102R is fixed to the housing 1 via mounting bosses 1*r* formed on the housing 1 (see FIG. 6). Note that FIG. 7 shows the positions of the non-contacting sections 1*p* formed at the fixation portion (the fixation range X) made by press-fitting or shrink-fitting between the inner housing 1*i* and the outer housing 1*o*. In the rear MG 100R, three non-contacting sections 1*p* are formed at the fixation portion along its circumferential direction where the inner circumferential surface of the outer housing 1*o* and the outer circumferential surface of the inner housing 1*i* do not in contact with each other.

Here, when being viewed in the axial direction, the fixation portion (the fixation range X) is divided along its circumferential direction by a second plane P2 that is parallel to a mounting reference plane PS of the control unit 102R and passes through the center O of the rotary shaft. Specifically, the fixation portion is divided into a third half circumferential range R3 on a side of the control unit 102R and a fourth half circumferential range R4 on the opposite side to the control unit 102R. In this case, the total circumferential length of the non-contacting sections 1*p* in the third half circumference range R3 is longer than the total circumferential length of the non-contacting sections 1*p* in the fourth half circumferential range R4.

Note that the mounting reference plane PS of the control unit 102R can be defined from the mounting plane formed by the above-described mounting bosses 1*r*. The stiffness of the fixation portion is not uniform along its circumferential direction, and the stiffness of the third half circumferential range R3, to which the control unit 102R is integrally coupled, is higher than the stiffness of the fourth half circumferential range R4. Therefore, the total circumferential length of the non-contacting sections 1*p* in the third half circumferential range R3 is longer than the total circumferential length of the non-contacting sections 1*p* in the fourth half circumferential range R4, and thereby the sufficient non-contacting sections 1*p* can be provided while ensuring the stiffness of the fixation portion to suppress the noise radiation. By arranging the non-contacting sections 1*p* in this manner, the noise radiation can be suppressed while ensuring the stiffness of the fixation portion.

Note that the control unit 102R is mounted on the housing 1 of the rear MG in the present embodiment, but part of the housing of the control unit 102R may be integrally formed with part of the housing 1 of the rear MG 100R. For example, the lower half of the housing of the control unit 102R may be integrally formed with part of the housing 1 of the rear MG 100R and the upper half of the control unit 102R may be formed as a lid.

With respect to the vibration modes of the cylindrical member expanding and contracting in its radial direction, the annular 0th vibration mode have already been described with reference to FIG. 5A and FIG. 5B. Here, the vibration modes of the annular n-th modes (n≥0) including the annular 0th will be briefly explained. FIG. 8A through FIG. 8F show schematically the vibration modes of the annular 0th to 5th vibration modes, respectively. In each vibration mode, the deformation indicated by the dotted line and the deformation indicated by the single-dotted line occur alternately with respect to a reference circle S. In the actual annular vibration of the cylindrical member, the n-th vibration modes like these are occur in a compound manner.

Figure 8A:
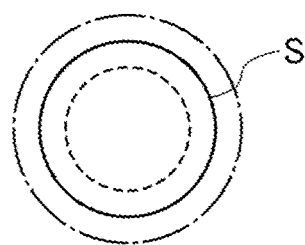
FIG. 8A is a schematic explanatory diagram showing an annular 0th vibration mode of the inner housing.
Figure 8B:
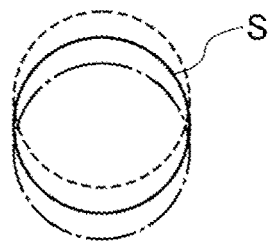
FIG. 8B is a schematic explanatory diagram showing an annular 1st vibration mode of the inner housing.
Figure 8C:
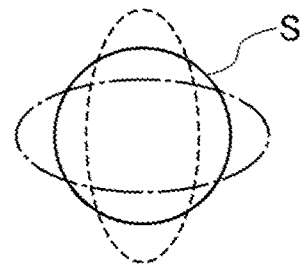
FIG. 8C is a schematic explanatory diagram showing an annular 2nd vibration mode of the inner housing.
Figure 8D:
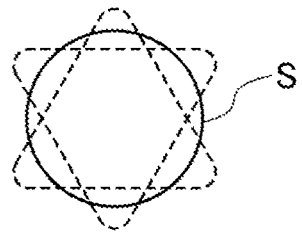
FIG. 8D is a schematic explanatory diagram showing an annular 3rd vibration mode of the inner housing.
Figure 8E:
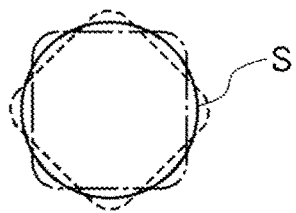
FIG. 8E is a schematic explanatory diagram showing an annular 4th vibration mode of the inner housing.
Figure 8F:
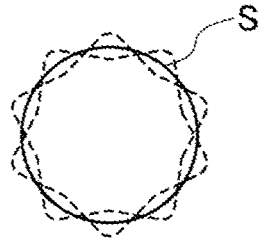
FIG. 8F is a schematic explanatory diagram showing an annular 5th vibration mode of the inner housing.

For example, when forming the four non-contacting sections 1*p* equally along the circumferential direction at the one end of the housing 1 in the axial direction, four contacting sections are formed. In this case, the annular vibration(s) is restrained at the contacting sections, and thereby the annular 4th vibration mode shown in FIG. 8E is emerged. In addition, the annular 2nd vibration mode is also emerged (2 is a divisor of 4). Or, when forming the six non-contacting sections 1*p* equally along the circumferential direction at the one end of the housing 1 in the axial direction, six contacting sections are formed. In this case, the annular 6th vibration mode is emerged. In addition, the annular 2nd and annular 3rd vibration modes are also emerged (2 and 3 are divisors of 6).

Note that the cases in which the non-contacting sections 1*p* (the contacting sections) are provided equally along the circumferential direction are explained above as examples, the number of the non-contacting sections 1*p* has relevance to the vibration order even without providing the non-contacting sections 1*p* equally along the circumferential direction. The annular vibration modes that occur simultaneously cause amplification of each other. Therefore, in order to suppress such amplification, it is preferable to make the number of the non-contacting section 1*p* described above a prime number. Since a divisor of a prime number are only 1 and its own, the above-mentioned amplification can be suppressed. That is, by making the number of non-contacting sections 1p a prime number, the noise radiation can be suppressed more effectively. In the present embodiment, the number of the non-contacting sections 1p in the front MG 100F is five as shown in FIG. 4 and the number of non-contacting sections 1p in the rear MG 100R is three as shown in FIG. 7 (a prime number in the both).

In addition, low order vibrations in the above-mentioned annular vibration mode occur in a low frequency band. As the frequency increases from low to high values, the annular n-th vibrations occur in a following order. Annular 1st, annular 2nd, annular 3rd, annular 4th, annular 0th, annular 5th, annular 6th, and . . . . As can be seen in FIG. 8A through FIG. 8E, the amplitude of the low order vibrations (especially, the annular 2nd and the annular 4th) that occur in the low frequency band is large, and it is difficult to suppress these vibrations. Therefore, it is preferable to suppress the low order annular vibrations by making the number of non-contacting sections 1p five or larger. In other words, it is preferable to provide five or larger prime number of the non-contacting sections 1p. By making the number of the non-contacting sections 1p a five or larger prime number, the noise radiation can be suppressed even more effectively.

Figure 9A:
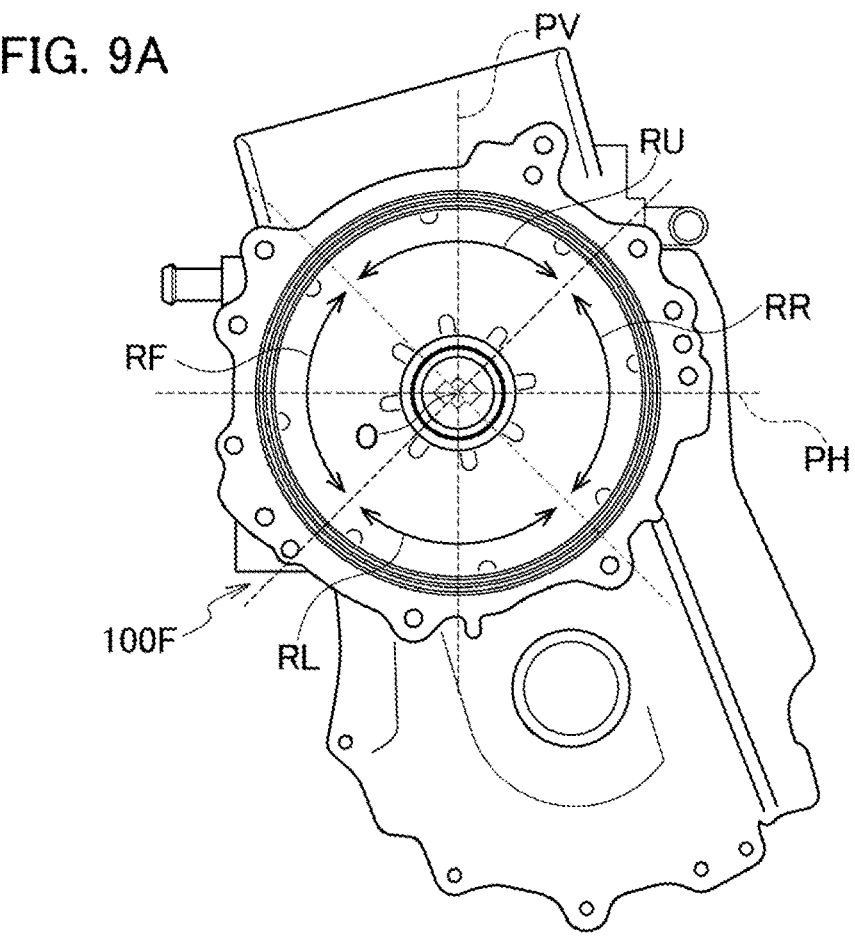
FIG. 9A is a side view showing an installation configuration of the front MG on a vehicle (first example).
Figure 9B:
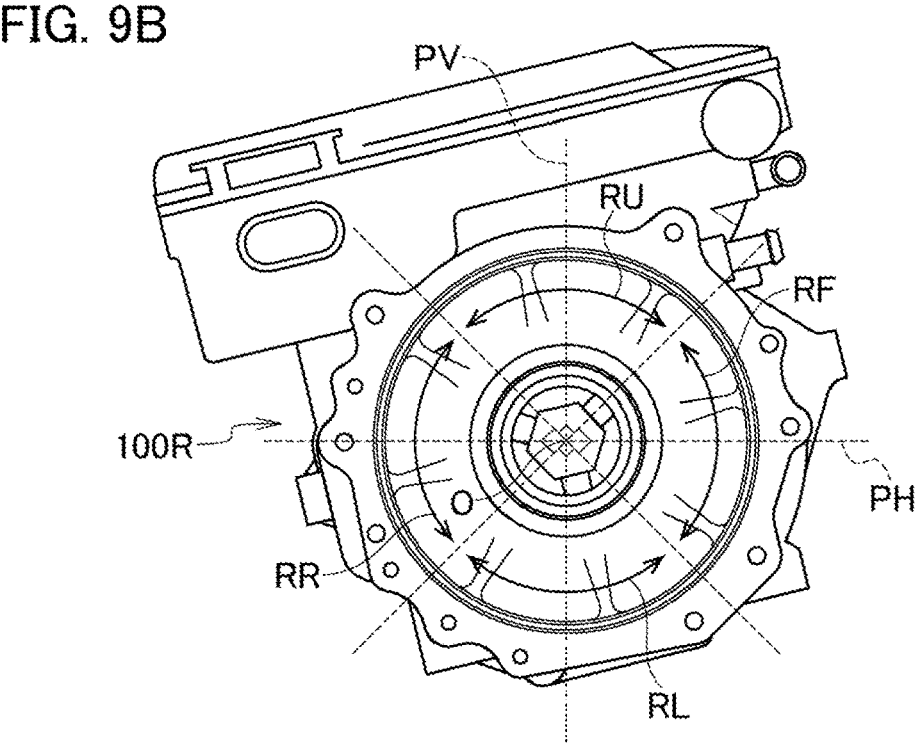
FIG. 9B is a side view showing an installation configuration of the rear MG on a vehicle (first example).

Hereinafter, preferred on-vehicle installation configuration of the above-described rotating electric machines (the front MG 100F and the rear MG 100R) of the present embodiment will be explained. First, the on vehicle installation configuration (a first example) considering the vibration during the vehicle V running will be explained with reference to FIG. 9A (the front MG 100F: left side view) and FIG. 9B (the rear MG 100R: right side view). FIG. 9A and FIG. 9B also show inclined states of the front MG 100F and the rear MG 100R that are installed on the vehicle.

Vertical vibrations is emerged pronouncedly while the vehicle V runs. Therefore, in the rotating electric machine (the front MG 100F and the rear MG 100R), it is preferable that the fixation portion of the inner housing 1i and the outer housing 1o by press-fitting or shrink-fitting has high stiffness in the vertical direction. Here, when being viewed in the axial direction as shown in FIG. 9A and FIG. 9B, the fixation portion (the fixation range X) is divided into four along its circumferential direction by using a horizontal plane PH and a vertical plane PV, which pass through the center O of the rotary shaft, as reference planes.

Specifically, it is divided to an upper quarter circumferential range RU, a lower quarter circumferential range RL, a front quarter circumferential range RF and a rear quarter circumferential range RR.

The central angle of each range is 90 degrees, and the horizontal plane PH or the vertical plane PV passes through the center of each range. In this case, the total circumferential length of the non-contacting sections 1p in the front quarter circumferential range RF and the rear quarter circumferential range RR is longer than the total circumferential length of the non-contacting sections 1p in the upper quarter circumferential range RU and the lower quarter circumferential range RL. By arranging the non-contacting sections 1p in this manner, the contacting sections with the longer circumferential length are arranged at the upper and lower sections on the circumference of the fixation portion, and thereby the stiffness (strength) of the fixation portion against the horizontal vibration of the vehicle V can be improved. As a result, the noise radiation can be suppressed.

The above-described on-vehicle installation configuration is the example in consideration of the vibrations during the vehicle V running. Next, an example considering the radiation of noise toward passengers in the vehicle V will be described (a second example). If the noise radiated toward the passengers can be reduced, comfortability of the passengers is improved. Here, when being viewed in the axial direction, the fixation portion (the fixation range X) is divided along its circumferential direction to a passenger compartment side range RP close to the passenger compartment PC and an opposite side range RO to the passenger compartment PC. In this case, the total circumferential length of the non-contacting sections 1p in the passenger compartment side range RP is longer than the total circumferential length of the non-contacting sections 1p in the opposite side range RO. By arranging the non-contacting sections 1p in this manner, the noise radiated toward the passenger compartment PC can be effectively suppressed by the non-contacting sections 1p.

Figure 10:
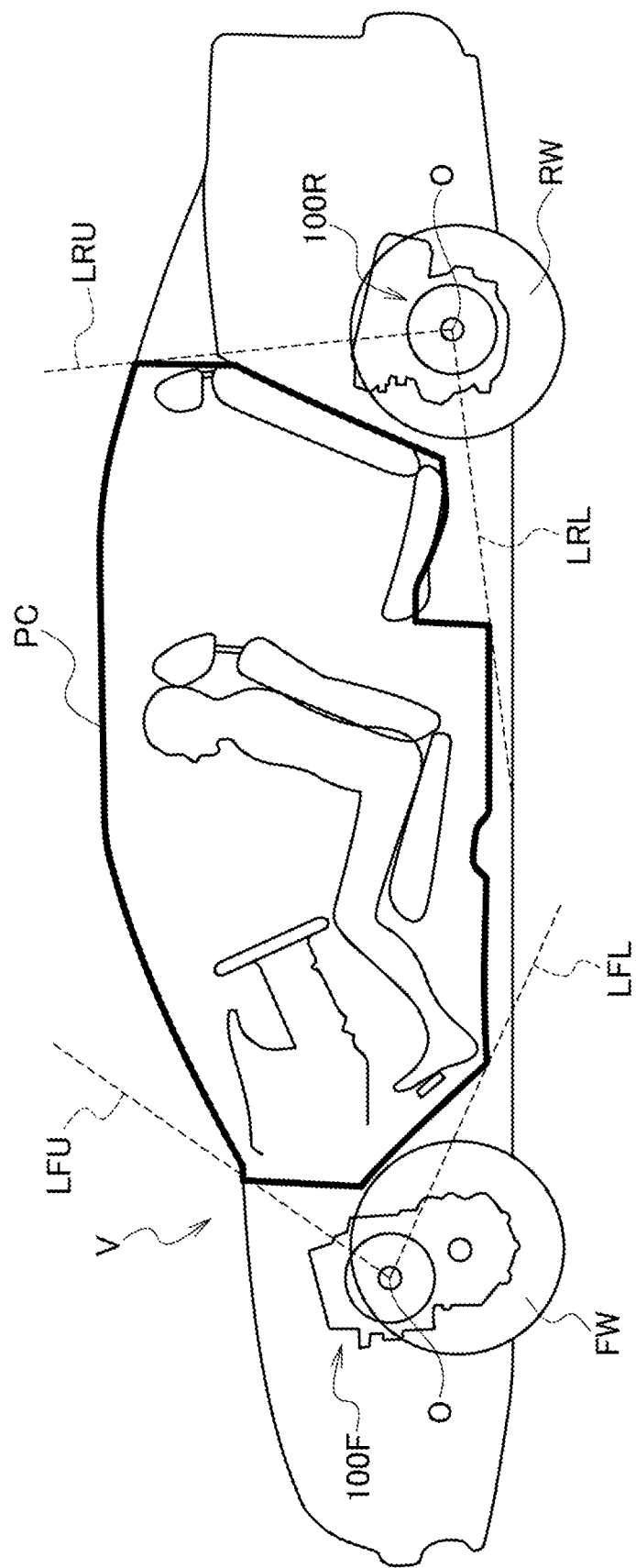
FIG. 10 is a schematic side view showing an installation configuration of the front MG and the rear MG on a vehicle (second A example).

An example for setting the passenger compartment side range RP and the opposite side range RO will be explained hereinafter. First, a second A example will be explained with reference to FIG. 10 (left side view), FIG. 11A (left side view) and FIG. 11B (right side view). As shown in FIG. 10, the outline of the passenger compartment PC is determined in the side view of the vehicle V. The passenger compartment PC is defined by panels and so on that form its outer shell. Specifically, the passenger compartment PC is defined by a roof panel, a front windshield, a bulkhead that partitions a motor room (an engine compartment) therefrom, and a floor panel. However, in consideration of a case where a rear space of the passenger compartment PC is continuous with a luggage compartment, the rear end of the passenger compartment PC is vertically partitioned at the rear end of the rearmost seat assembly.

Figure 11A:
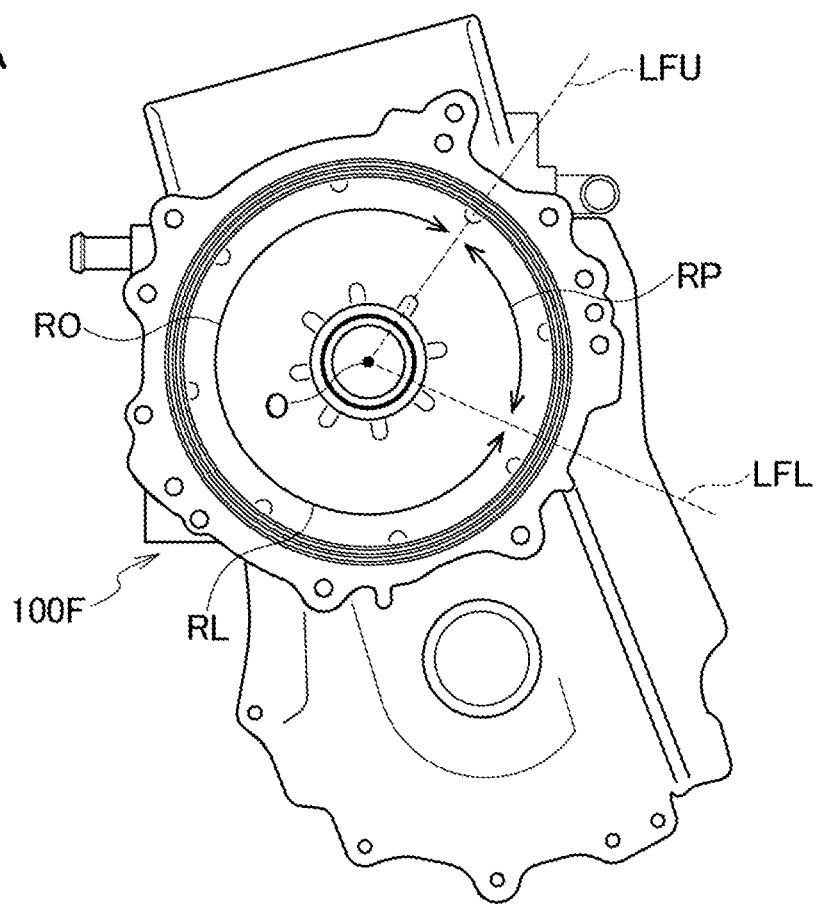
FIG. 11A is a side view showing the installation configuration of the front MG on the vehicle in the second A example.

Tangent lines are drawn upward and downward from the centers O of the rotary shafts of each of the rotating electric machines with respect to the passenger compartment PC defined as explained above. For the front MG 100F, the upward tangent line LFU and the downward tangent line LFL can be drawn. For the rear MG 100R, the upper tangent line LRU and the lower tangent line LRL can be drawn. As shown in FIG. 11A (left side view), for the front MG 100F, the fixation portion (the fixation range X) is divided into the passenger compartment side range RP and the opposite side range RO along its circumferential direction by the tangent line LFU and the lower tangent line LFL. Of course, the range closer to the passenger compartment PC is the passenger compartment side range RP.

Figure 11B:
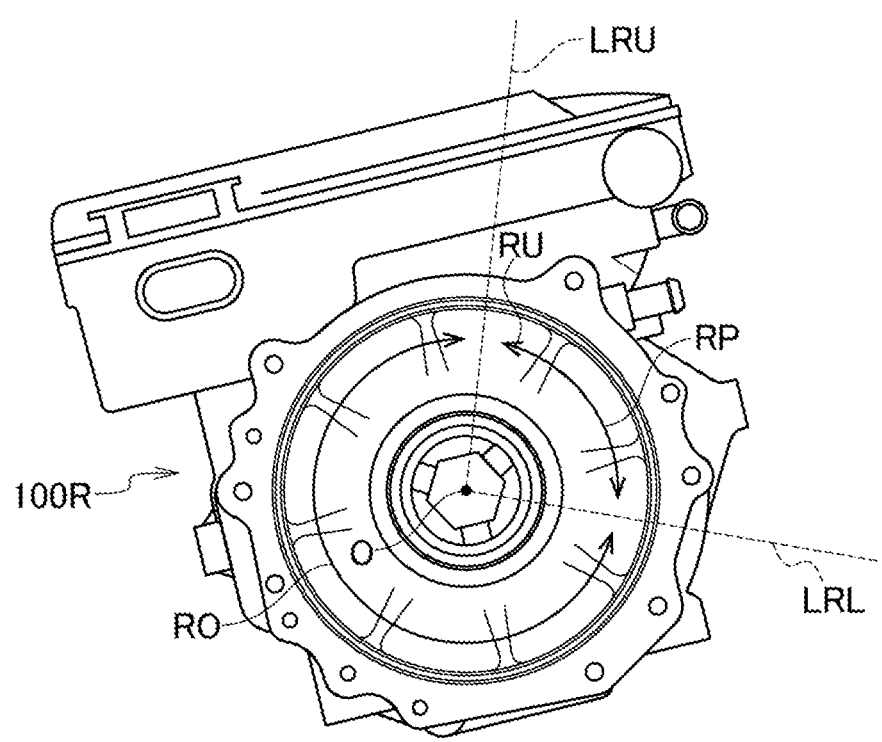
FIG. 11B is a side view showing the installation configuration of the rear MG on the vehicle in the second A example.

On the other hand, as shown in FIG. 11B (right side view), for the rear MG 100R, the fixation portion (the fixation range X) is divided into the passenger compartment side range RP and the opposite side range RO along its circumferential direction by the tangent line LRU and the lower tangent line LRL. Note that FIGS. 11A and 11B show the inclined states the front MG 100F and the rear MG 100R that are installed on the vehicle, respectively. As described above, by defining the passenger compartment side range RP and the opposite side range RO in consideration of the space of the passenger compartment PC and then arranging the non-contacting sections 1p, the noise radiated toward the passenger compartment PC can be effectively suppressed.

Figure 12:
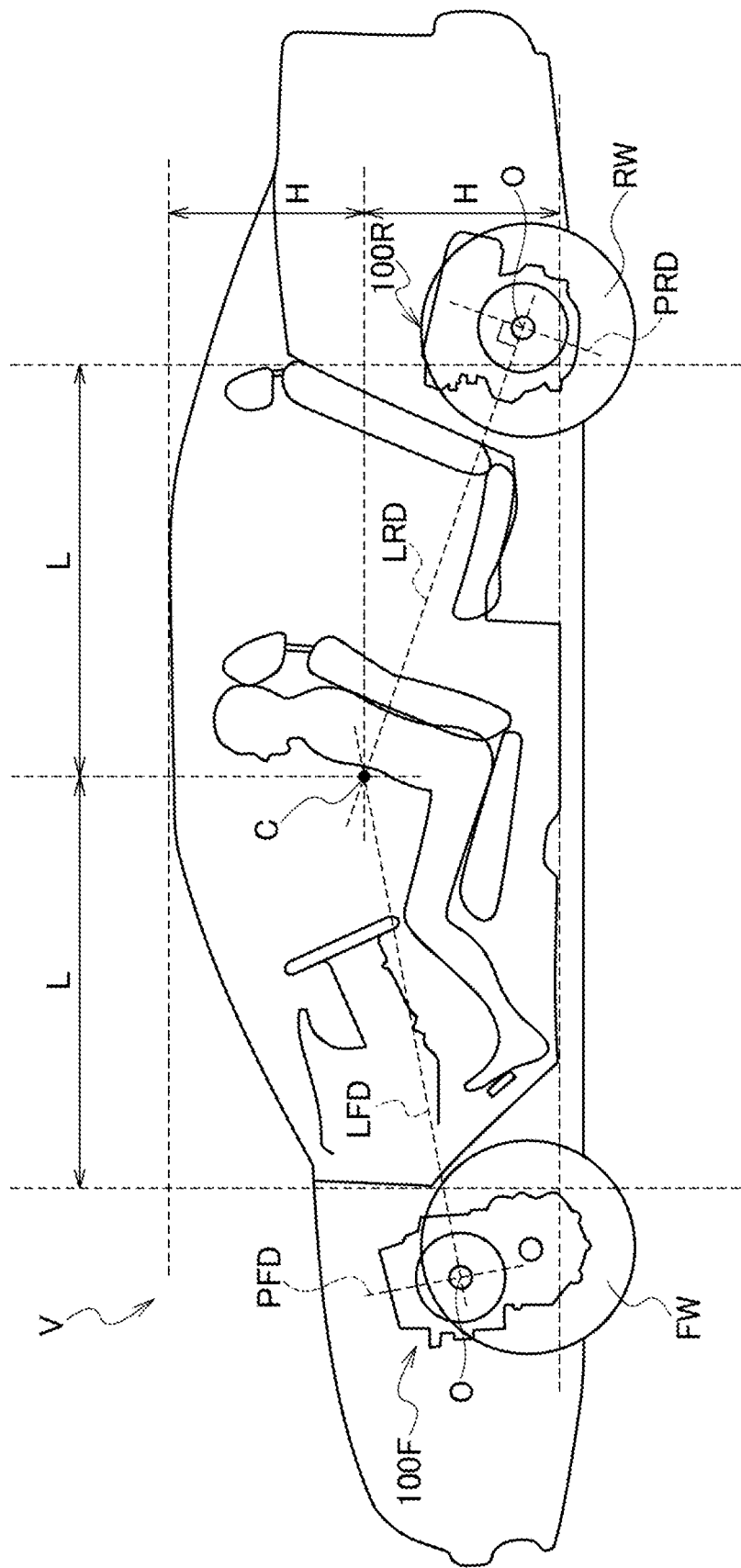
FIG. 12 is a schematic side view showing an installation configuration of the front MG and the rear MG on a vehicle (second B example).

Next, a second B example will be explained with reference to FIG. 12 (left side view), FIG. 13A (left side view) and FIG. 13B (right side view). In the second A example, the passenger compartment PC is considered as a space, but the passenger compartment PC is represented by its center C in the present embodiment. The center C is obtained from the vehicle room PC defined in the same way as in the first example. As shown in FIG. 12, in the side view of the vehicle V, a vertical line is drawn at the center of a total length 2L of the passenger compartment PC and a horizontal line is drawn at the center of an overall height 2H of the passenger compartment PC. The intersecting point of these vertical and horizontal lines is the center C of the compartment PC.

Direction lines are drawn from the centers O of the rotary shafts of the rotating electric machines with respect to the center C defined as explained above. For the front MG 100F, the direction lines LFD passing through the centers C and O can be drawn. In addition, a dividing plane PFD perpendicular to the direction line LFD and passing through the center O can be defined. For the rear MG 100R, the direction line LRD passing through the centers C and O can be drawn. In addition, a dividing plane PRD perpendicular to the direction line LRD and passing through the center O can be defined.

Figure 13A:
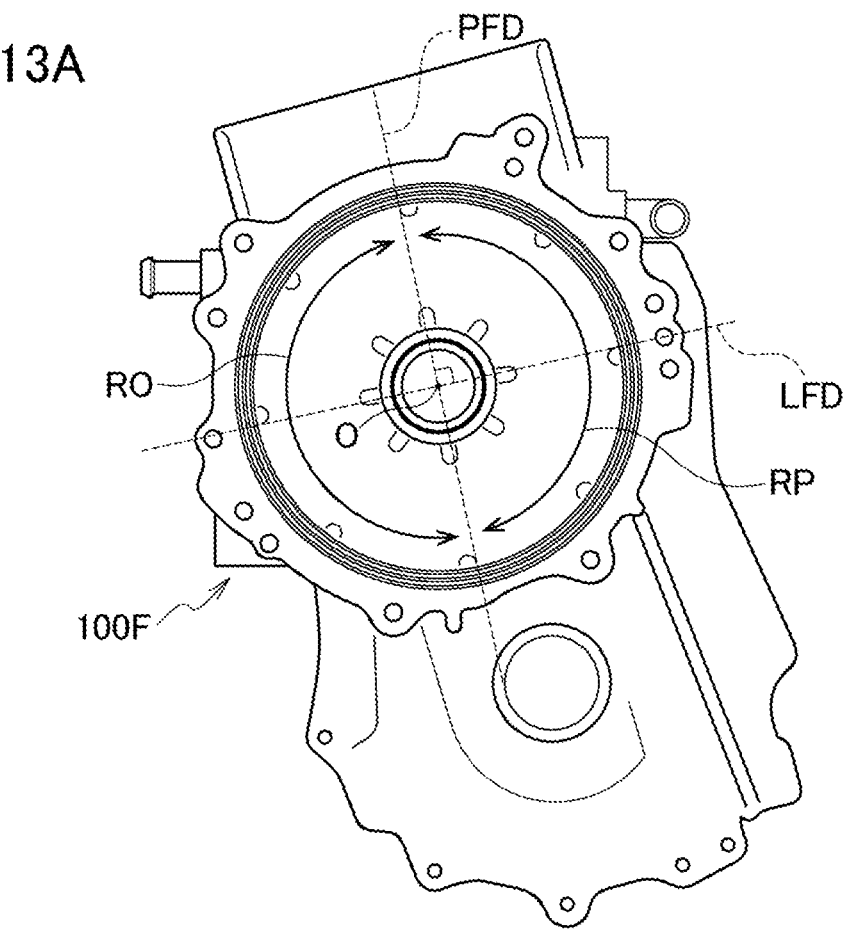
FIG. 13A is a side view showing the installation configuration of the front MG on the vehicle in the second B example.
Figure 13B:
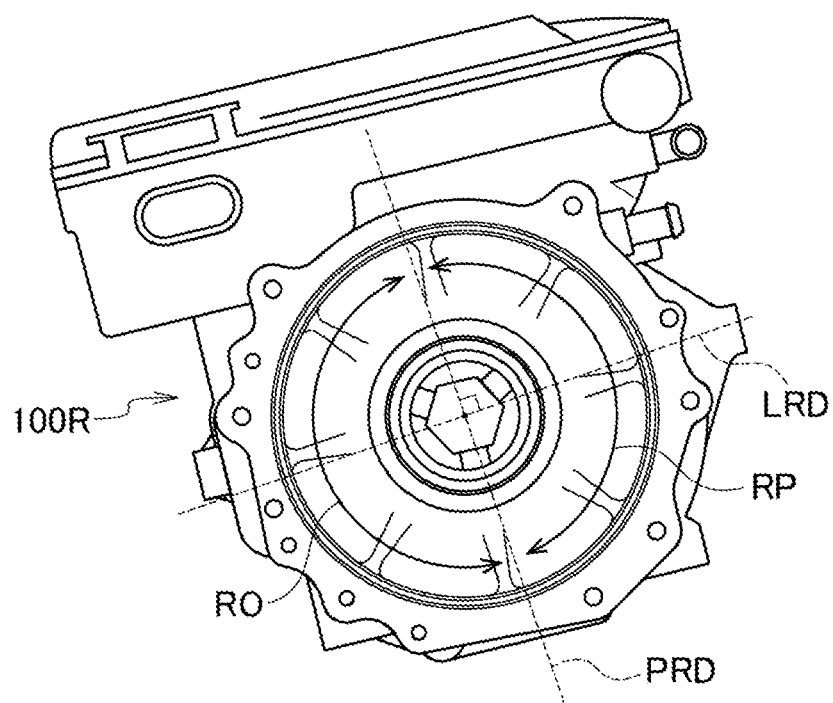
FIG. 13B is a side view showing the installation configuration of the rear MG on the vehicle in the second B example.

As shown in FIG. 13A (left side view), for the front MG 100F, the fixation portion (the fixation range X) is divided into the passenger compartment side range RP and the opposite side range RO along its circumferential direction by the dividing plane PFD. On the other hand, as shown in FIG. 13B (right side view), for the rear MG 100R, the fixation portion (the fixation range X) is divided into the passenger compartment side range RP and the opposite range RO along its circumferential direction by the dividing plane PRD. Note that FIG. 13A and FIG. 13B show the inclined states the front MG 100F and the rear MG 100R that are installed on the vehicle, respectively. As described above, by defining the passenger compartment vehicle side range RP and the opposite side range RO in consideration of the center C of the passenger compartment PC and arranging the non-contacting sections 1p, the noise radiated toward the passenger compartment PC can be effectively suppressed.

Next, a second C example will be explained with reference to FIG. 14 (left side view), FIG. 15A (left side view) and FIG. 15B (right side view). In the present example, the passenger compartment side range RP and the opposed side range RO are set in consideration of the position of the passenger's ears in the passenger compartment PC. The position of the driver's ears is considered as a representative of the passenger's ears. However, since the position of the driver's ears cannot be determined uniquely, the uppermost point [uppermost point] T of the seat assembly, i.e., the uppermost point T of the headrest S3, is used instead of the position of the driver's ears. The seat assembly mainly includes a seat cushion S1, a seat back S2 and a headrest S3, and their height levels and angles are adjustable. The uppermost point T herein is the position of the upper end of the headrest S3 in the state where the headrest S3 is positioned highest by adjusting the height levels and the angles.

The adjustable slide position of the driver's seat assembly is set to the rearmost position. The tilt angle and the height level of the seat cushion S1 is set to the position that brings the uppermost point T. The angle of the seat back S2 is also set to the position that brings the above-mentioned uppermost point T, usually considered to be the most upright position. With respect to the headrest S3, it is considered to be set at the position that it is pulled out the most from the seatback S2, and if its angle is adjustable, it is set at the angle that brings the above-mentioned topmost point T.

Figure 14:
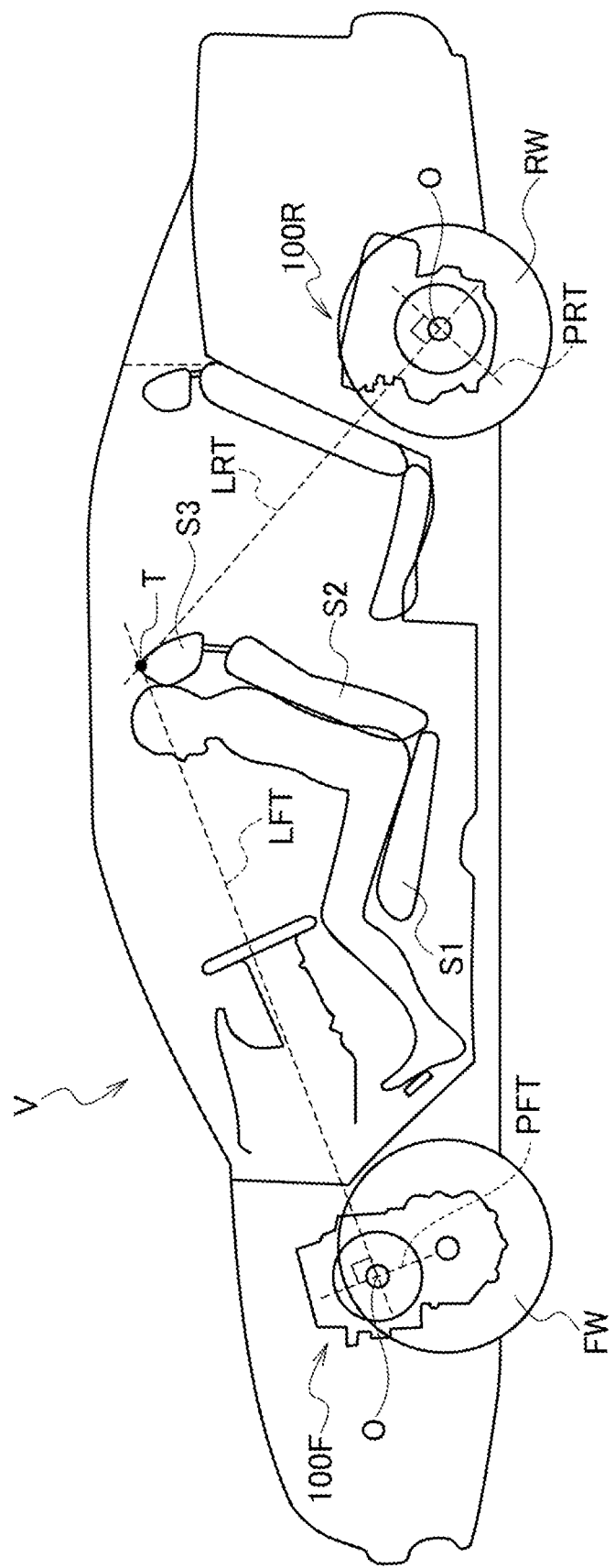
FIG. 14 is a schematic side view showing an installation configuration of the front MG and the rear MG on a vehicle (second C example).

As shown in FIG. 14, direction lines are drawn from the centers O of the rotary shafts of the rotating electric machines with respect to the uppermost point T, respectively, in the side view of the vehicle V. For the front MG 100F, the direction line LFT passing through the uppermost point T and the center O can be drawn. In addition, a dividing plane PFT perpendicular to the direction line LFT and passing through the center O can be defined. For the rear MG 100R, the direction line LRT passing through the uppermost point T and the center O can be drawn. In addition, a dividing plane PRT perpendicular to the direction line LRT and passing through the center O can be defined.

Figure 15A:
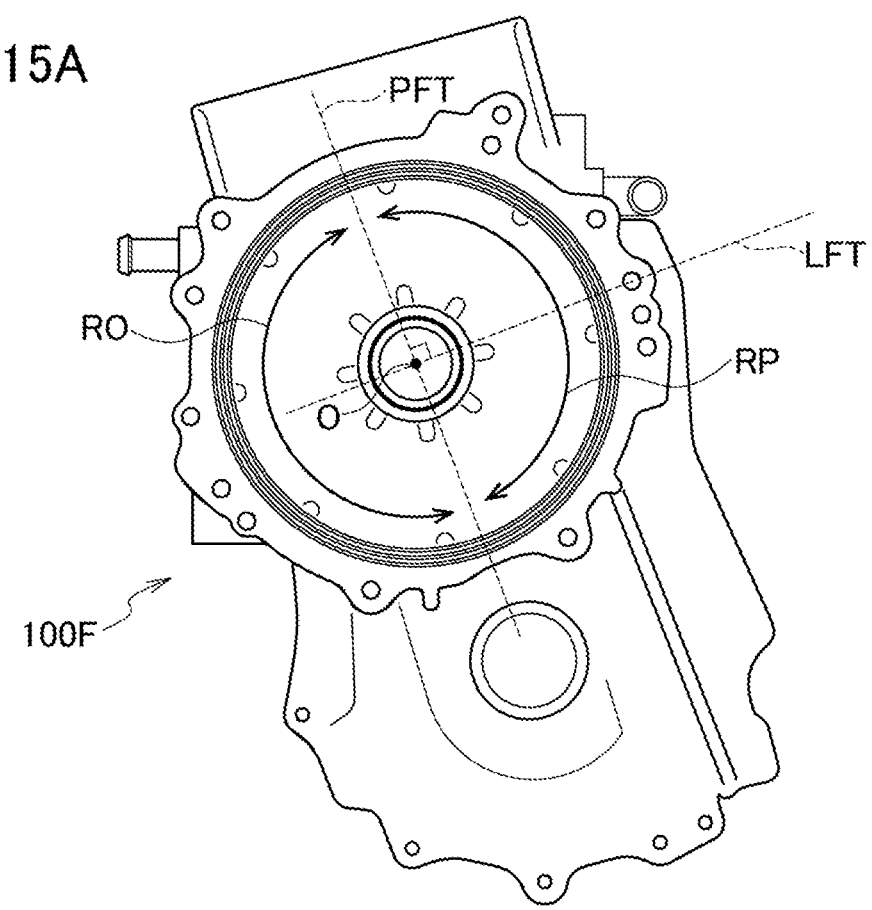
FIG. 15A is a side view showing the installation configuration of the front MG on the vehicle in the second C example.
Figure 15B:
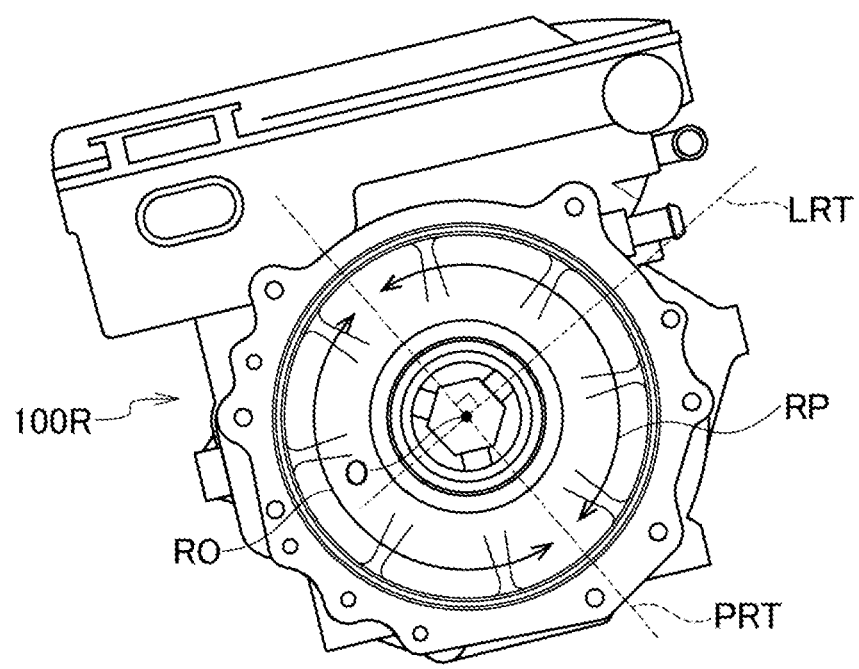
FIG. 15B is a side view showing the installation configuration of the rear MG on the vehicle in the second C example.

As shown in FIG. 15A (left side view), for the front MG 100F, the fixation portion (the fixation range X) is divided into the passenger compartment side range RP and the opposite side range RO along its circumferential direction by the dividing plane PFT. On the other hand, as shown in FIG. 15B (right side view), for the rear MG 100R, the fixation portion (the fixation range X) is divided into the passenger compartment side range RP and the opposite range RO along its circumferential direction by the dividing plane PRT. Note that FIG. 15A and FIG. 15B show the inclined states the front MG 100F and the rear MG 100R that are installed on the vehicle, respectively. As described above, by defining the passenger compartment side range RP and the opposite side range RO in consideration of the uppermost point T and arranging the non-contacting sections 1p, the noise radiated toward (the passengers in) the passenger compartment PC can be effectively suppressed.

According to the above embodiment, the housing 1 is provided with the double-tube structure to form the coolant flow channel inside. Here, the inner housing 1i and the outer housing 1o are fixed with each other by press-fitting or shrink-fitting at the one end, and fixed with each other by bolt-fastening at the other end. Then, the one or more non-contacting sections 1p are formed at the fixation portion (the fixation range X) in its circumferential direction where the inner circumferential surface of the outer housing 1o and the outer circumferential surface of the inner housing 1i are not in contact with each other. By the non-contacting sections 1p, the outward transferring and radiation of the noise caused by the vibrations generated at the rotating electric machines (the front MG 100F and the rear MG 100R) can also be suppressed.

In addition, when being viewed in the axial direction of the rotary shaft of the rotating electric machine (the front MG 100F or the rear MG 100R), at least one bolt 5 is located within each center angle range of the non-contacting sections 1p. Therefore, the vibration mode, in which the annular vibration is made at the both ends in the axial direction in a coordinate phase to cause the large pressure fluctuations in the housing 1, can be suppressed and thereby the noise can be suppressed more effectively.

In addition, as shown in FIG. 3, the first half circumferential range R1 and the second half circumferential range R2 are defined based on the center O of the rotary shaft of the rotating electric machine (the front MG 100F) and the center O1 of the output shaft of the front gear unit 101F. In this case, the total circumferential length of the non-contacting sections 1p in the first half circumferential range R1 is longer than the total circumferential length of the non-contacting sections 1p in the second half circumferential range R2. Since the housing 1 of the rotating electric machine is reinforced by the housing of the front gear unit 101F, the stiffness (strength) of the housing 1 within the first half circumferential range R1 becomes higher than that within the second half circumferential range R2. Therefore, by making the total circumferential length of the non-contacting sections 1p in the first half circumferential range R1 longer than the total circumferential length of the non-contacting sections 1p in the second half circumferential range R2, the noise radiation can be suppressed by providing the non-contacting sections 1p sufficiently while ensuring the stiffness of the fixation portion.

In addition, as shown in FIG. 7, the third half circumferential range R3 and the fourth half circumferential range R4 is defined based on the center O of the rotary shaft of the rotating electric machine (the rear MG 100R) and the position of the control unit 102R. In this case, the total circumferential length of the non-contacting sections 1p in the third half circumferential range R3 is longer than the total circumferential length of the non-contacting sections 1p in the fourth half circumferential range R4. Since the housing 1 of the rotating electric machine is reinforced by the housing of the control unit 102R, the stiffness (strength) of the housing 1 within the third half circumferential range R3 becomes higher than that within the fourth half circumferential range R4. Therefore, by making the total circumferential length of the non-contacting sections 1p in the third half circumferential range R3 longer than the total circumferential length of the non-contacting sections 1p in the fourth half circumferential range R4, the noise radiation can be suppressed by providing the non-contacting sections 1p sufficiently while ensuring the stiffness of the fixation portion.

In addition, the non-contacting sections 1p are provided along the circumferential direction of the housing 1 in prime number. This allows the amplification of the annular n-th vibration modes to be suppressed. As a result, the noise radiation can be suppressed more effectively. In particular, it is preferable to provide five or larger prime number of the non-contacting sections 1p (see FIG. 4), which can suppress the low-order annular n-th vibrations with large amplitude and thereby can suppress the noise radiation even more effectively.

Furthermore, when the rotating electric machine (the front MG 100F or the rear MG 100R) is mounted on the vehicle, the upper quarter circumferential range RU, the lower quarter circumferential range RL, the front quarter circumferential range RF and the rear quarter circumferential range RR are defined as shown in FIG. 9A and FIG. 9B. In this case, the total circumferential length of the non-contacting sections 1p within the front quarter circumferential range RF and the rear quarter circumferential range RR is longer than the total circumferential length of the non-contacting sections 1p within the upper quarter circumferential range RU and the lower quarter circumferential range RL. By arranging the non-contacting sections 1p in this manner, (not the non-contacting sections 1p but) the contacting sections with the longer circumferential length are arranged at the upper and lower sections on the circumference of the fixation portion, and thereby the stiffness (strength) of the fixation portion against the horizontal vibration of the vehicle V can be improved. As a result, the noise radiation can be suppressed.

Furthermore, when the rotating electric machine (the front MG 100F or the rear M G100R) is mounted on the vehicle, the passenger compartment side range RP and the opposite side range RO are defined based on the position of the center O of the rotary shaft of the rotating electric machine as shown in FIG. 11A, FIG. 11B and so on. In this case, the total circumferential length of the non-contacting sections 1p in the passenger compartment side range RP is longer than the total circumferential length of the non-contacting sections 1p in the opposite range RO. By arranging the non-contacting sections 1p in this manner, the noise radiated toward the passenger compartment PC can be suppressed effectively by the non-contacting sections 1p.

Note that the present invention is not limited to the embodiment described above. For example, the above vehicle V is a four-wheel-drive vehicle in which the front wheels FW are driven by the front MG 100F and the rear wheels RW can be driven by the rear MG 100R. However, the vehicle V may be a vehicle equipped with only one rotating electric machine (the front MG 100F or the rear MG 100R). In addition, the rotating electric machine doesn't have to be a motor for driving the wheels, nor doesn't have to be mounted on the vehicle.

REFERENCE SIGNS LIST 100F front MG (rotating electric machine)
101F front gear unit
100R rear MG (rotating electric machine)
101R rear gear unit
102R control unit
1 housing
1i inner housing
1o outer housing
1c inner circumferential fixed portion (fixed portion by press-fitting or shrink-fitting)
1n outer circumferential fixed portion (fixed portion by press-fitting or shrink-fitting)
1d flange (bolt-fastening portion)
1e bolt hole (bolt-fastening portion)
1f flange (bolt-fastening portion)
1h bolt hole (bolt-fastening portion)
1p non-contacting section
5 bolt
O center (of the rotary shaft of the rotating electric machine)
O1 center (of the output shaft of the gear unit)
L1 straight line (passing through the center O and the center O1)
P1 first plane
R1 first half circumferential range
R2 second half circumferential range
P2 second plane
R3 third half circumferential range
R4 fourth circumferential range
RU upper quarter circumferential range
RL lower quarter circumferential range
RF front quarter circumferential range
RR rear quarter circumferential range
PC passenger compartment
RC passenger compartment side range
RO opposite side range
V vehicle

The invention claimed is:
1. A rotating electric machine comprising:
a tube-shaped outer housing; and
a tube-shaped inner housing provided within the outer housing and forming a coolant flow channel between the outer housing and the inner housing;
wherein the inner housing is fixed with the outer housing by a press-fit or a shrink-fit at one end thereof in an axial direction of a rotary shaft accommodated within the inner housing, and fastened with the outer housing at another end thereof in the axial direction by a plurality of bolts,
wherein one or more non-contacting sections, in which an inner circumferential surface of the outer housing and an outer circumferential surface of the inner housing are not in contact with each other, are formed at a fixation portion made by the press-fit or the shrink-fit between the outer housing and the inner housing along a circumferential direction thereof, and wherein at least one of the plurality of bolts is located within each center angle range of the one or more non-contacting sections.

2. The rotating electric machine according to claim 1, further comprising:

a gear unit that functions as a gear reducer for an output of the rotating electric machine, wherein a housing of the gear unit is integrally coupled with the outer housing, wherein an output shaft of the gear unit is not coincident with but parallel to the rotary shaft of the rotating electric machine, and wherein, when dividing the fixation portion into a first half circumferential range on a side of the output shaft and a second half circumferential range on an opposite side to the output shaft by a plane that is perpendicular to a straight line passing through a center of the rotary shaft and a center of the output shaft and passes through the center of the rotary shaft when being viewed in the axial direction, a total circumferential length of the one or more non-contacting sections in the first half circumferential range is longer than a total circumferential length of the one or more non-contacting sections in the second half circumferential range.

3. The rotating electric machine according claim 1, further comprising:

a control unit that controls the rotating electric machine, wherein the control unit is fixed to the outer housing, and wherein, when dividing the fixation portion into a first half circumferential range on a side of the control unit and a second half circumferential range on an opposite side to the control unit by a plane that is parallel to a mounting reference plane of the control unit and passes through a center of the rotary shaft when being viewed in the axial direction, a total circumferential length of the one or more non-contacting sections in the first half circumferential range is longer than a total circumferential length of the one or more non-contacting sections in the second half circumferential range.

4. The rotating electric machine according to claim 1, wherein a number of the one or more non-contacting sections provided along the circumferential direction is a prime number.

5. The rotating electric machine according to claim 4, wherein the number of the one or more non-contacting sections is five or more.

6. An installation configuration of the rotating electric machine according to claim 1 on a vehicle, wherein, when dividing the fixation portion, along the circumferential direction thereof, into an upper quarter circumferential range, a lower quarter circumferential range, a front quarter circumferential range and a rear quarter circumferential range, each of which has a center angle of 90 degrees, by using a horizontal plane and a vertical plane as reference planes when being viewed in the axial direction in a state of being installed on a vehicle, a total circumferential length of the one or more non-contacting sections in the front quarter circumferential range and the rear quarter circumferential range is longer than a total circumferential length of the one or more non-contacting sections in the upper quarter circumferential range and the lower quarter circumferential range.

7. An installation configuration of the rotating electric machine according to claim 1 on a vehicle, wherein, when dividing the fixation portion, along the circumferential direction thereof, into a passenger compartment side range closer to a passenger compartment and an opposite side range on an opposite side to the passenger compartment when being viewed in the axial direction in a state of being installed on a vehicle, a total circumferential length of the one or more non-contacting sections in the passenger compartment side range is longer than a total circumferential length of the one or more non-contacting sections in the opposite side range.

* * * * *